United States Patent
Funane

(10) Patent No.: US 10,911,446 B2
(45) Date of Patent: Feb. 2, 2021

(54) SYSTEM, METHOD USED IN SYSTEM, INFORMATION PROCESSING APPARATUS, METHOD OF CONTROLLING INFORMATION PROCESSING APPARATUS, AND MEDIUM

(71) Applicant: CANON KABUSHIKI KAISHA, Tokyo (JP)

(72) Inventor: Nao Funane, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 242 days.

(21) Appl. No.: 16/194,889

(22) Filed: Nov. 19, 2018

(65) Prior Publication Data

US 2019/0165937 A1    May 30, 2019

(30) Foreign Application Priority Data

Nov. 28, 2017    (JP) .................................. 2017-228380

(51) Int. Cl.
*H04L 29/06*    (2006.01)
*G06F 21/32*    (2013.01)
(Continued)

(52) U.S. Cl.
CPC .......... *H04L 63/0861* (2013.01); *G06F 21/32* (2013.01); *H04L 9/30* (2013.01); *H04L 9/3247* (2013.01); *H04L 9/3271* (2013.01)

(58) Field of Classification Search
None
See application file for complete search history.

(56) References Cited

U.S. PATENT DOCUMENTS 10,122,719 B1 *  11/2018  Vltavsky .............. H04W 12/06
10,142,464 B1 *  11/2018  Cairns ................. H04M 3/4365
(Continued)

FOREIGN PATENT DOCUMENTS

JP    2017016397 A    1/2017

OTHER PUBLICATIONS

Extended European Search Report issued in European Appln. No. 18207342.9 dated Feb. 21, 2019.
(Continued)

*Primary Examiner* — Benjamin E Lanier
(74) *Attorney, Agent, or Firm* — Rossi, Kimms & McDowell LLP

(57) ABSTRACT

A voice assistant requests a first terminal among a plurality of terminals to execute an authentication process, receives a result of the authentication process from one of the plurality of terminals, and transmits the result of the authentication to a service providing system as response to the authentication request in a case in which an authentication request is accepted from the service providing system. Each of the plurality of terminals executes a biometric authentication process using user's biometric information read by the biometric information sensor using an authenticator if a request from the voice assistant is received and responds to the voice assistant with a result of the biometric authentication process. The voice assistant requests a second terminal other than the first terminal among the plurality of terminals to execute an authentication process if a predetermined condition is satisfied after requesting the first terminal to execute the authentication process.

12 Claims, 19 Drawing Sheets

(51) Int. Cl.
*H04L 9/32* (2006.01)
*H04L 9/30* (2006.01)

(56) References Cited

U.S. PATENT DOCUMENTS

| | | | | |
|---|---|---|---|---|
| 10,157,275 | B1* | 12/2018 | Venkatasamy | G06F 21/42 |
| 10,305,891 | B2* | 5/2019 | Votaw | H04L 63/0838 |
| 10,623,403 | B1* | 4/2020 | Gupta | H04L 63/102 |
| 10,708,777 | B2* | 7/2020 | Kim | G06F 21/45 |
| 2005/0286746 | A1* | 12/2005 | Silvester | G06F 21/32 |
| | | | | 382/116 |
| 2014/0289833 | A1* | 9/2014 | Briceno | H04L 63/08 |
| | | | | 726/7 |
| 2015/0095188 | A1* | 4/2015 | Lee | G06Q 30/0633 |
| | | | | 705/26.8 |
| 2015/0154597 | A1* | 6/2015 | Bacastow | G06Q 20/322 |
| | | | | 705/72 |
| 2015/0186636 | A1* | 7/2015 | Tharappel | H04L 9/3231 |
| | | | | 726/8 |
| 2016/0180072 | A1 | 6/2016 | Ligatti et al. | |
| 2016/0337346 | A1* | 11/2016 | Momchilov | G06F 21/41 |
| 2016/0379220 | A1* | 12/2016 | Tunnell | H04W 12/06 |
| | | | | 705/71 |
| 2017/0078295 | A1* | 3/2017 | Hwang | A61B 5/0205 |
| 2017/0149570 | A1* | 5/2017 | Counterman | H04L 63/102 |
| 2017/0193314 | A1* | 7/2017 | Kim | G06F 21/35 |
| 2018/0004930 | A1* | 1/2018 | Csinger | H04L 9/3234 |
| 2018/0232514 | A1* | 8/2018 | Brown | H04L 63/0869 |
| 2018/0232516 | A1* | 8/2018 | Richardson | G06F 21/32 |
| 2018/0365467 | A1* | 12/2018 | Robison | G06K 9/00087 |
| 2019/0026716 | A1* | 1/2019 | Anbukkarasu | G06F 21/44 |

OTHER PUBLICATIONS

Hu et al. "Security Analysis of an Attractive Online Authentication Standard: FIDO UAF Protocol" Fido Alliance URL: https://fidoalliance.org/specs/fido-uaf-v1.1-ps-20170202/fido-uaf-overview-v1.1-ps-20170202.pdf. Retrieved on Jun. 25, 2018: 1-11.

Gonzalez-Manzano et al. "Access control for the Cloud based on multi-device authentication." IEEE Trustcom/BigDataSE/ISPA. 2015: 856-863.

Baghdasaryan et al. "FIDO UAF Authenticator Commands" Fido Alliance URL: https://fidoalliance.org/specs/fido-uaf-v1.1-id-20170202/fido-uaf-authnr-cmds-v1.1-id-20170202.pdf. Retrieved on Feb. 13, 2019: 1-31.

Office Action issued in U.S. Appl. No. 16/142,460 dated Nov. 12, 2020.

\* cited by examiner

SYSTEM, METHOD USED IN SYSTEM, INFORMATION PROCESSING APPARATUS, METHOD OF CONTROLLING INFORMATION PROCESSING APPARATUS, AND MEDIUM

BACKGROUND OF THE INVENTION

Field of the Invention

The present invention relates to a system that realizes a secured authentication system and is used for improving user convenience.

Description of the Related Art

In recent years, Fast Identity Online (FIDO) has attracted attention as a new authentication system including biometric authentication. Biometric information such as a fingerprint or a vein pattern used in biometric authentication cannot be rewritten in a case in which such information leaks to the outside, unlike in conventional passwords for ID/password authentication, and accordingly, leakage of such information is critical.

In contrast to this, FIDO performs a registration process in advance between a device held by a user and a server providing a web service. A case in which biometric information is used as authentication information will be described. In the registration process, a secret key associated with a user's biometric information is stored in the device, and information such as authentication identification information associated with the biometric information, a public key that becomes a pair with a secret key, and the like is stored in the server. Then, authentication is performed not on the server through the Internet but on the device held by the user, and an authentication result signed by the secret key flows on a network. In other words, since no biometric information as authentication information flows on the network, a risk of information leakage can be regarded as being low.

Meanwhile, in recent years, a voice assistant device (voice operation device) having a speaker function has generally been used. Here, a voice assistant device will be referred to as a voice assistant. A voice assistant is an information device having a function of analyzing a user's speaking using a voice recognition function and executing various instructions from the user. The voice assistant has an advantage of reducing the effort of performing key operations or touch inputs on a conventional personal computer (PC), a smartphone, or the like by enabling an instruction using speech.

As one example of a method of using a voice assistant, a voice assistant is installed in a living room or the like of a house, and, by a user giving an instruction using speech, desired music can be transmitted, or a product can be ordered using a mail-order service that is available on the Internet.

Japanese Patent Laid-open No. 2017-16397 discloses that, when a transaction is executed in Internet banking, a transaction device randomly selects one from among authentication methods registered in advance. A technology is disclosed in which a user's authentication information is read for fingerprint authentication, vein pattern authentication, or the like using a wearable terminal corresponding to the selected authentication method, the authentication information is transmitted from the wearable terminal to the transaction device, and authentication is executed in the transaction device.

In a case in which a service on a network is used through a device such as a voice assistant or a personal computer (PC), it is conceivable to register various kinds of information associated with biometric information for voiceprint authentication in advance. In addition, it is conceivable to use fingerprint authentication or vein pattern authentication other than voiceprint authentication. In such a case, similar to Japanese Patent Laid-open No. 2017-16397, it is conceivable to register a wearable terminal and the like held by a user in advance as authentication devices used for fingerprint authentication, vein pattern authentication, or the like and use these authentication devices.

However, it cannot be said that a terminal for using fingerprint authentication or vein pattern authentication will constantly be in a usable state in the hands of a user. For example, in a case in which a wearable terminal is necessary for executing fingerprint authentication, there may be a case in which the wearable terminal is not being held, or a case in which the power is off. In such a case, it is conceivable that a user may need to return to pick up a smartphone, or an authentication process may not be able to be performed.

In addition, in Japanese Patent Laid-open No. 2017-16397, a registration process, an authentication process, and the like that are unique to a special authentication method such as FIDO described above are not considered at all.

SUMMARY OF THE INVENTION

The present invention provides a structure in which an authentication process can be performed more flexibly by improving user convenience while employing an authentication system that handles authentication information (biometric information and the like) in a more secure manner.

According to one embodiment of the present invention, a system is provided that includes a plurality of terminals and an information processing apparatus that is capable of communicating with the plurality of terminals and a service providing system on a network, wherein the information processing apparatus comprises: a memory storing first instructions, and at least one processor executing the first instructions causing the information processing apparatus to: request a first terminal among the plurality of terminals to execute an authentication process in a case in which an authentication request is accepted from the service providing system; receive a result of the authentication process from one of the plurality of terminals; and transmit the result of the authentication to the service providing system as a response to the authentication request, wherein each of the plurality of terminals comprises: an authentication module that is used for an authentication process; a storage having a tamper resistance configured to store user's biometric information required when the authentication process is performed using the authentication module; a biometric information sensor configured to read biometric information; a memory storing second instructions, and at least one processor executing the second instructions causing the terminal to: execute, by the authentication module, the authentication process using the user's biometric information store in the storage and read by the biometric information sensor in a case in which a request from the information processing apparatus is received; and transmit a result of the executed authentication process to the information processing apparatus as a response to the request from the information processing apparatus, and wherein the first instructions further cause the information processing apparatus to, in a case in which a predetermined condition is satisfied after requesting the first terminal to execute the authentication process, request a second terminal other than the first terminal among the plurality of terminals to execute an authentication process.

According to the present invention, a structure capable of improving user convenience and performing an authentication process more flexibly than in a conventional case can be provided.

Further features of the present invention will become apparent from the following description of exemplary embodiments (with reference to the attached drawings).

DESCRIPTION OF THE EMBODIMENTS

Hereinafter, embodiments of the present invention will be described with reference to the drawings and the like. The present invention relates to a structure in which a service provided from an external system through a network performs biometric authentication on a device (terminal) held by a user for authenticating the user, and, as a result, the service authenticates the user. This can be realized by registering in advance information associated with biometric authentication in a device held by a user, for example, authentication identification information, a public key, and the like in a service. For one example of such a structure, although Fast Identity Online (FIDO) is used, it should be noted that the present invention is not limited to FIDO.

First Embodiment

Figure 1:
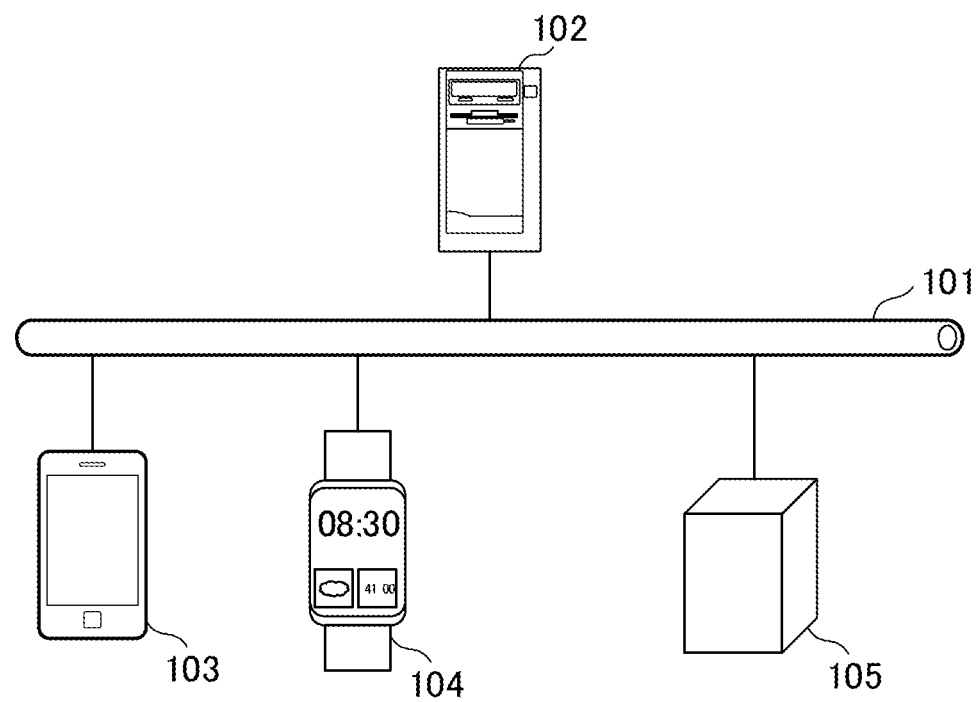
FIG. 1 is a diagram illustrating the entire configuration of a system according to one embodiment of the present invention.

FIG. 1 is a diagram illustrating the entire configuration of a system according to one embodiment of the present invention. The system illustrated in FIG. 1 includes a server 102, a smartphone 103, a smartwatch 104, and a voice assistant 105. The server 102, the smartphone 103, the smartwatch 104, and the voice assistant 105 are interconnected through a network 101.

The network 101, for example, is one of a LAN such as the Internet, a WAN, a telephone circuit line, a dedicated digital circuit line, an ATM or frame relay line, a cable television line, a data broadcast radio circuit, and the like. In addition to the network circuit lines described above, for example, near radio communications such as a near field communication (NFC) and Bluetooth (registered trademark), and the like may be included. Furthermore, the network 101 may be a so-called communication network realized by a combination thereof. The network 101 may transmit and received data.

The server 102 is an external system (service providing system) that provides a service and may be composed of a plurality of devices, and a part or the whole thereof may be constructed using resources such as a virtual machine and a storage. The smartphone 103 may be a personal computer (PC), a tablet terminal, or the like. The smartwatch 104 is a wearable terminal and may be a wearable terminal of a different form such as smartglasses, an accessory (an earphone, a headphone, a ring, a necklace, a nail, or the like), shoes, underwear, a heart rate meter, an internal-use device, or a human body-embedded device.

The wearable terminal, for example, is a collective name for mobile terminals (terminals) that can be carried by a user such as a watch-type mobile terminal (smartwatch) and a glasses-type mobile terminal (smartglasses). In addition, the wearable terminal does not necessarily need to be able to be mounted on a user. The smartwatch is assumed to have a vein pattern authentication function, and the smartglasses are assumed to have an iris authentication function.

In FIG. 1, although one smartphone 103 and one smartwatch 104 are illustrated as connected to the network 101, the numbers thereof are not limited thereto. For example, a plurality of smartphones 103, PCs, and tablet terminals may be connected to the network 101, and wearable terminals such as a plurality of smartwatches 104 may be connected to the network 101. In other words, this system is a system that includes a plurality of terminals such as the smartphone 103 and the smartwatch 104.

The voice assistant 105 is an information processing apparatus that analyzes an input using speech from a user and communicates with the mobile terminals such as the smartphone 103 and the smartwatch 104 described above, the server 102, and the like on the basis of a result of the analysis. The voice assistant 105 may be a PC or the like that has a voice analysis function. In addition, the voice assistant may be an information processing apparatus having no voice analysis function as long as it can communicate with the mobile terminals such as the smartphone 103 and the smartwatch 104 described above, the server 102, and the like. In such a case, in subsequent processes, instead of an input using speech from the user, for example, an input from an input device such as a keyboard may be accepted.

Figure 2:
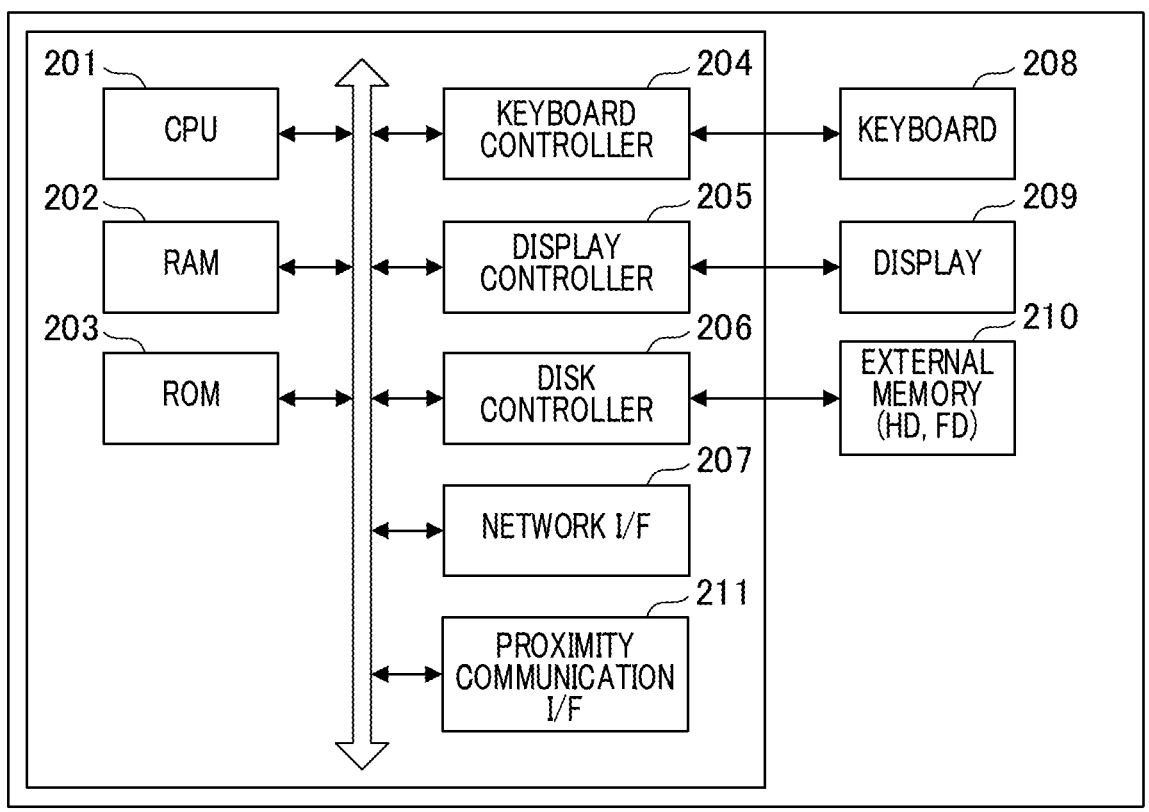
FIG. 2 is a diagram illustrating an example of the hardware configuration of a server.

FIG. 2 is a diagram illustrating an example of the hardware configuration of the server 102. The CPU 201 executes a program stored in the ROM 203 and programs such as an operation system (OS) and an application loaded from an external memory 210 into the RAM 202. In other words, the CPU 201 executes a program stored in a readable storage medium, thereby functioning as each processing unit executing the process of each flowchart to be described later.

The RAM 202 is a main memory of the CPU 201 and functions as a work area or the like. The keyboard controller 204 controls an operation input from a keyboard 208 or a pointing device not illustrated in the drawing. The pointing device, for example, is a mouse, a touch pad, a touch panel, a track ball, or the like. The display controller 205 controls a display of the display 209.

The disk controller 206 controls a data access to the external memory 210 such as a hard disk (HD), a flexible disk (FD), or the like storing various kinds of data. A network I/F 207 is connected to the network 101 and executes a process of controlling communication with other devices connected to the network 101. A proximity communication I/F 211 is a network I/F that corresponds to a communication system for proximity communication such as NFC or Bluetooth.

Figure 3:
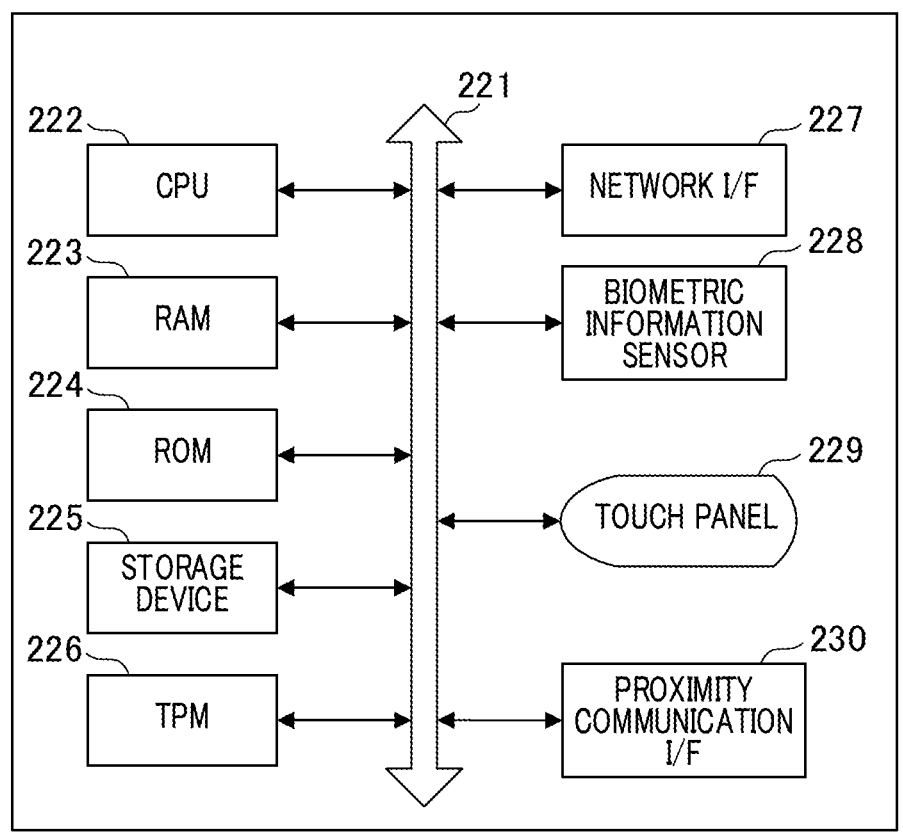
FIG. 3 is a diagram illustrating an example of the hardware configuration of a terminal.

FIG. 3 is a diagram illustrating an example of the hardware configuration of a terminal such as the smartphone 103 and the smartwatch 104. A CPU 222 executes programs stored in a ROM 224 and a storage device 225, thereby performing overall control of each configuration to be described later through an internal bus 221. The programs include a program that realizing a process of each flowchart to be described later. A RAM 223 functions as a memory and a work area of the CPU 222.

A storage device 225 is a storage device such as a solid state drive (SSD) or an SD memory card and functions as an external device. A trusted platform module (TPM) 226 is a memory unit that has a tamper resistance of preventing stored data from being read from the outside for the purpose of processing or storing confidential information. A network I/F 227 exchanges data with an external network device in a unidirectional or bidirectional manner.

A biometric information sensor 228 is a sensor that reads a user's biometric information and, for example, converts the read user's biometric information such as a fingerprint, an iris, a voiceprint, or a face into a signal. However, the biometric information is not limited thereto. A touch panel 229 has two functions of a display and an input and displays a screen of an application, a keyboard, and the like, and when a user applies pressure to the screen using a finger or a dedicated pen outputs information of a screen position that has been touched to the outside as an information signal.

As the output signal information is used by an application, a user can operate the application through the touch panel 229. A proximity communication I/F 230 is a network I/F that corresponds to a communication system for proximity communication such as NFC or Bluetooth.

Figure 4:
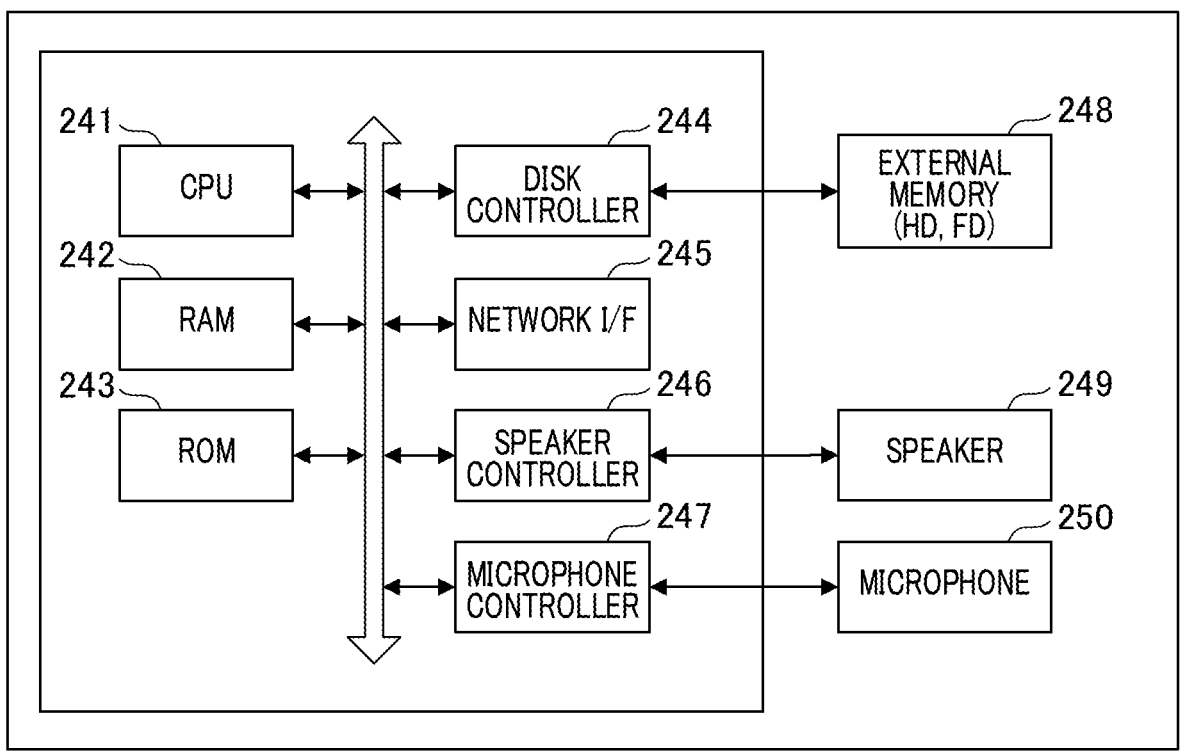
FIG. 4 is a diagram illustrating an example of the hardware configuration of a voice assistant.

FIG. 4 is a diagram illustrating an example of the hardware configuration of an information processing apparatus such as the voice assistant 105. A CPU 241 executes a program stored in a ROM 243 and programs such as an OS and an application loaded from an external memory 248 into a RAM 242. In other words, the CPU 241 executes a program stored in a readable storage medium, thereby functioning as each processing unit executing the process of each flowchart to be described later.

The RAM 242 is a main memory of the CPU 241 and functions as a work area or the like. A disk controller 244 controls data access to the external memory 248 such as a hard disk (HD) or a flexible disk (FD) that stores various kinds of data. A network I/F 245 is connected to the network 101 and executes a process of controlling communication with other devices connected to the network 101. A speaker controller 246 controls a speaker 249. A microphone controller 247 controls a microphone 250.

The voice assistant 105 is not limited to the hardware configuration illustrated in FIG. 4. A voice assistant 105 is a voice operating device that accepts a voice input and executes a process corresponding to the input, and, for example, the voice assistant can execute a biometric authentication process. In such a case, the voice assistant 105 may include hardware used for reading biometric information, for example, a camera or the like.

Figure 5:
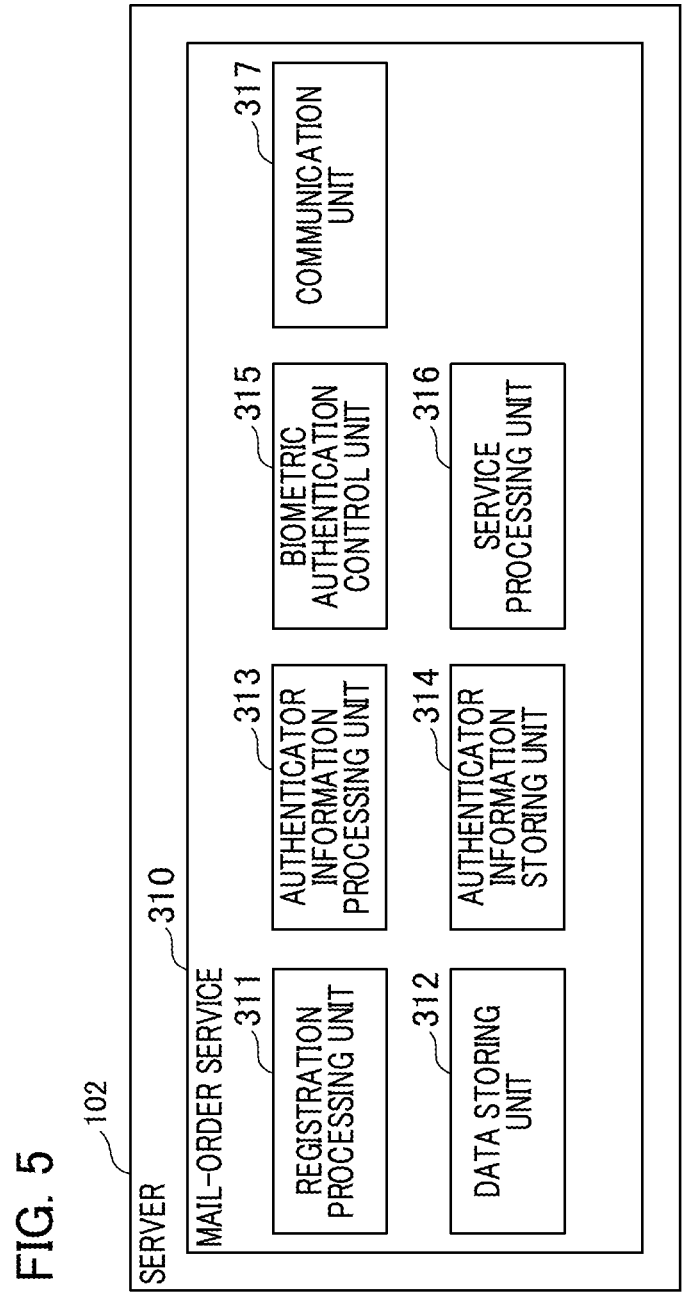
FIG. 5 is a diagram illustrating one example of the functional configuration of a server.

FIG. 5 is a diagram illustrating one example of the functional configuration of the server 102. In the server 102, a mail-order service 310 operates as one example of a service that is provided for a user. The mail-order service 310 is realized by the CPU 201 reading a program stored in the ROM 203 included in the server 102 into the RAM 202 and executing the program. In this embodiment, although the mail-order service is described as an example of a service provided for a user, the service is not limited thereto. For example, the service may be a music distribution service available on the Internet or the like and may be any service on a network.

The mail-order service 310 includes a registration processing unit 311, a data storing unit 312, an authenticator information processing unit 313, an authenticator information storing unit 314, a biometric authentication control unit 315, a service processing unit 316, and a communication unit 317. The registration processing unit 311 is a software module that stores data such as user information in the data storing unit 312.

The authenticator information processing unit 313 is a software module that stores information relating to an authenticator 330 to be described later in the authenticator information storing unit 314 using a credential received by the communication unit 317. In addition, the authenticator information processing unit 313 verifies an assertion, which will be described later, received by the communication unit 317.

The communication unit 317 is a software module that is used for communicating with external devices such as the voice assistant 105, the smartphone 103, and the smartwatch 104 through the network I/F 207. The authenticator information storing unit 314 is a software module that stores information relating to the authenticator 330 to be described later (authenticator information) in the external memory 210 or an external storage system (not illustrated in the drawing) using a table D.

The biometric authentication control unit 315 is a software module that executes a request for biometric authentication for the authenticator 330 and receives a result of the biometric authentication. In this embodiment, the biometric authentication control unit 315 executes a request for biometric authentication for an authenticator 330 included in the smartphone 103, the smartwatch 104, or the like through the voice assistant 105. In this embodiment, although the biometric authentication control unit 315 is included in the mail-order service 310, the biometric authentication control unit 315 is not limited thereto.

For example, the biometric authentication control unit 315 may be configured as being independent from the mail-order service 310, and the mail-order service 310 may call the independent biometric authentication control unit 315. In this way, by configuring the biometric authentication control unit 315 as being independent from the mail-order service 310, a configuration in which not only the mail-order service 310 but also another service or an application can call the biometric authentication control unit 315 may be formed. The service processing unit 316 is a software module that retrieves service information or executes a product purchasing process in response to a service request received by the communication unit 317.

Figure 6:
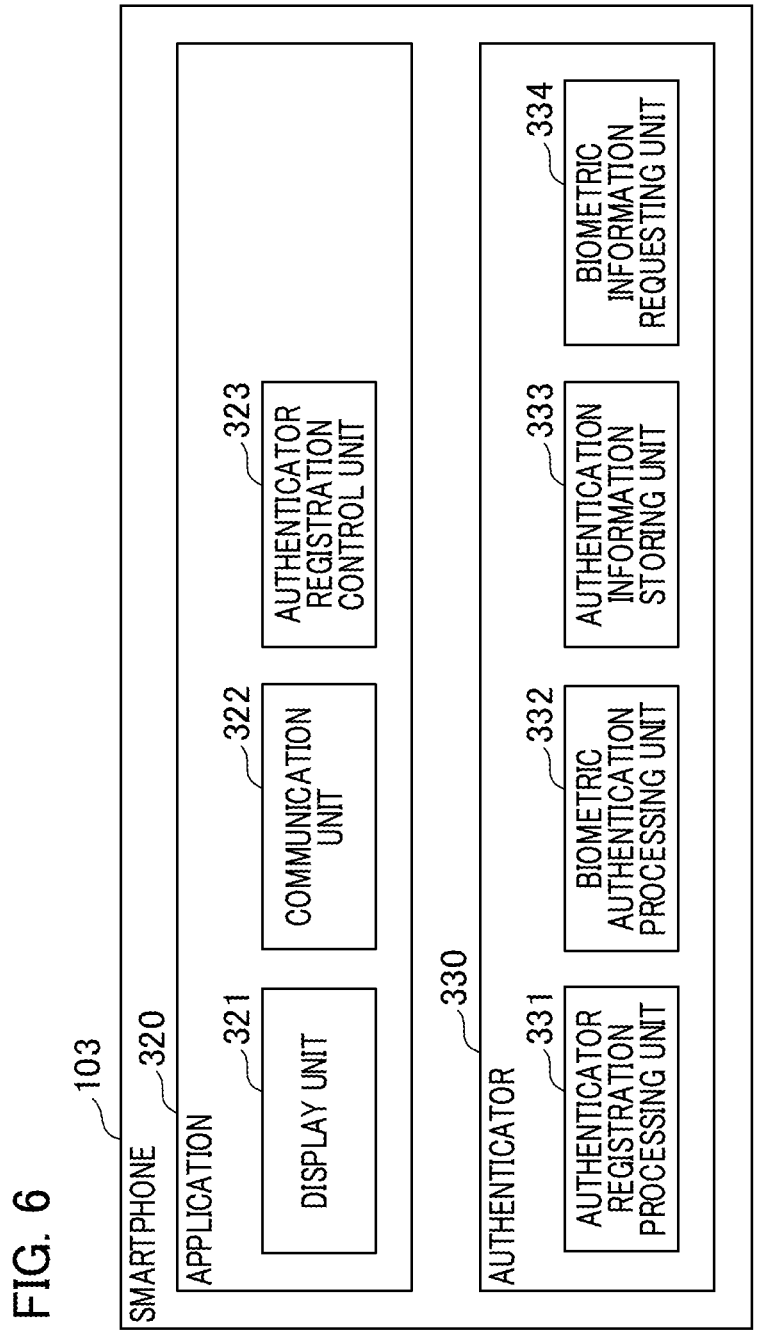
FIG. 6 is a diagram illustrating one example of the functional configuration of a smartphone.

FIG. 6 is a diagram illustrating one example of the functional configuration of the smartphone 103. In the smartphone 103, an application 320 and an authenticator 330 operate. The application 320 and the authenticator 330 are realized by a CPU 222 reading a program stored in a ROM 224 included in the smartphone 103 into a RAM 223 and executing the program.

The application 320 provides an authentication function using biometric information according to this embodiment and a service of the server 102 for a user in cooperation with the server 102. The application 320 is a native application and a web browser installed in the smartphone 103. The application 320 includes a display unit 321, a communication unit 322, and an authenticator registration control unit 323.

The display unit 321 is a software module that displays a UI of an application installed in the smartphone 103 or accepts a user's operation through the touch panel 229. The communication unit 322 is a software module that is used for communicating with an external device such as the server 102 through the network I/F 227 or the proximity communication I/F 230. The authenticator registration control unit 323 is a software module that requests the authenticator 330 to generate a credential to be described later.

In this embodiment, although the authenticator registration control unit 323 is included in the application 320, the configuration is not limited thereto. For example, the authenticator registration control unit 323 may be configured independently from the application 320, and the application 320 may call the independent authenticator registration control unit 323. In addition, the authenticator registration control unit 323 may be mounted in an OS as a standard feature.

In this way, by configuring the authenticator registration control unit 323 to be independent from the application 320, a configuration in which not only the application 320 but also another application can call the authenticator registration control unit 323 is formed.

The authenticator 330 is an authentication module that is used for biometric authentication using biometric information read from the biometric information sensor 228. The authenticator 330 includes an authenticator registration processing unit 331, a biometric authentication processing unit 332, an authentication information storing unit 333, and a biometric information requesting unit 334.

The authenticator registration processing unit 331 accepts a request for generating a credential from the authenticator registration control unit 323 or the like of the application 320. The authenticator registration processing unit 331 is a software module that generates a pair of keys (a secret key and a public key) and generates a credential. The biometric authentication processing unit 332 is a software module that accepts a biometric authentication request from the biometric authentication control unit 315 or the like of the mail-order service 310 and executes biometric authentication using biometric information read by the biometric information sensor 228.

The authentication information storing unit 333 is a software module that stores authentication information and the like in the TPM 226. The authentication information, for example, is information illustrated in a table A to be described later. The biometric information requesting unit 334 is a software module that provides a UI used for accepting an input of biometric information for a user through the touch panel 229.

Figure 7:
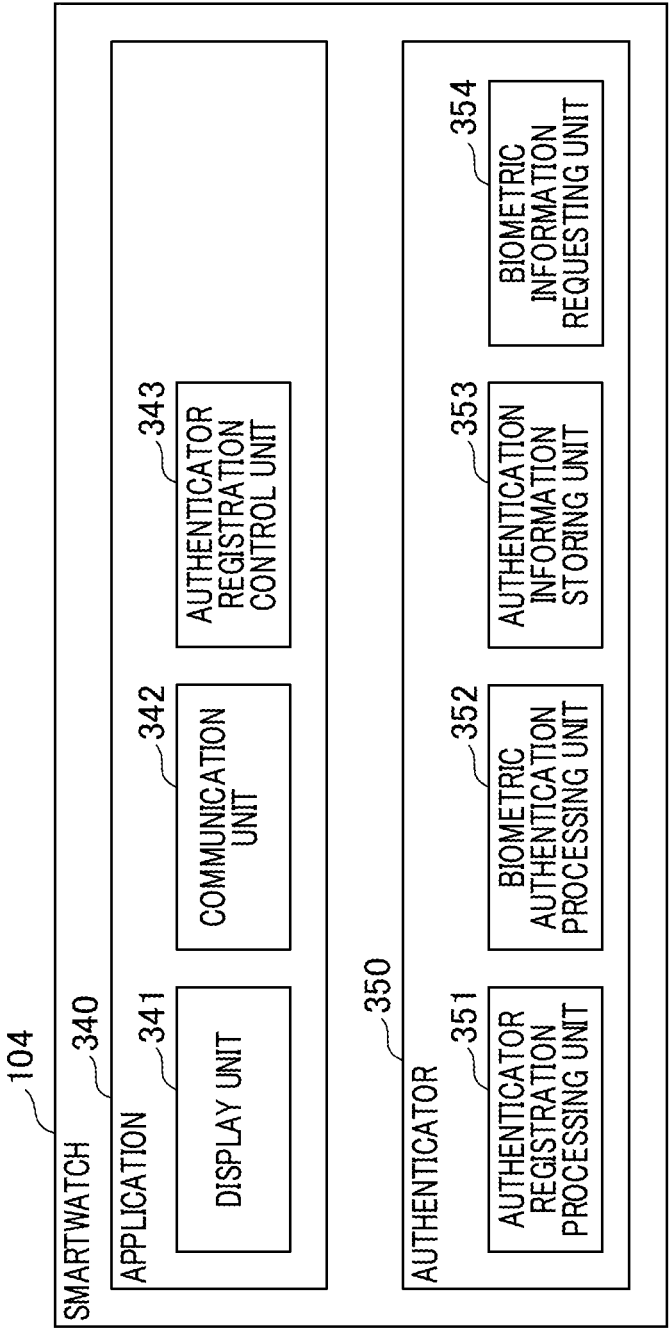
FIG. 7 is a diagram illustrating one example of the functional configuration of a smartwatch.

FIG. 7 is a diagram illustrating one example of the functional configuration of the smartwatch 104. The functional configuration of the smartwatch 104 is similar to the functional configuration of the smartphone 103, and thus, description thereof will not be presented here.

Figure 8:
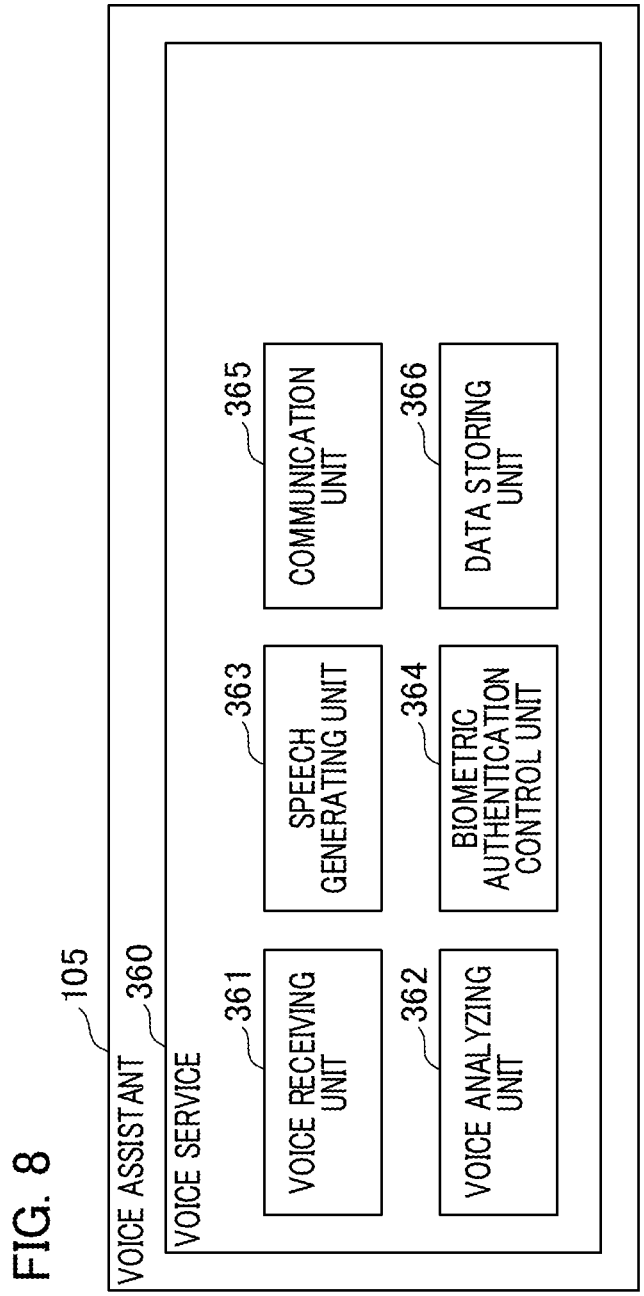
FIG. 8 is a diagram illustrating one example of the functional configuration of a voice assistant.

FIG. 8 is a diagram illustrating one example of the functional configuration of the voice assistant 105. In the voice assistant 105, a voice service 360 operates. The voice service 360 is realized by a CPU 241 reading a program stored in a ROM 243 included in the voice assistant 105 into a RAM 242 and executing the program. The voice service 360 provides a service of the server 102 for a user in cooperation with the server 102.

The voice service 360 includes a voice receiving unit 361, a voice analyzing unit 362, a speech generating unit 363, a biometric authentication control unit 364, a communication unit 365, and a data storing unit 366. The voice receiving unit 361 is a software module that receives speech generated by a user through the microphone 250 included in the voice assistant 105. The voice analyzing unit 362 is a software module that analyzes a voice received by the voice receiving unit 361.

The speech generating unit 363 is a software module that executes service guidance using a user voice through the speaker 249 included in the voice assistant 105. The biometric authentication control unit 364 is a software module that requests the authenticator 330 to execute biometric authentication and receives a result of the biometric authentication. The communication unit 365 is a software module that is used for communicating with external devices such as the server 102 and the smartphone 103 through the network I/F 245. The data storing unit 366 is a software module that stores user's voiceprint information, information relating to an authenticator of each terminal, and the like in the external memory 248 or the like.

Next, various kinds of data managed by the smartphone 103 will be described. The table A is one example of data stored in the TPM 226 by the authentication information storing unit 333 of the authenticator 330 included in the smartphone 103.

TABLE A

| Authentication information ID | Service ID | Secret key | Biometric information ID |
|---|---|---|---|
| 407c-8841-79d | hotel-service.com | 1faea2da-a269-4fa7-812a-509470d9a0cb | d493a744 |
| 4c04-428b-a7a2 | service-a.com | d7ae30c8-3775-4706-8597-aaf681bc30f5 | dcc97daa |
| 92b2-498d-bea6 | service-b.com | 36ae5eed-732b-4b05-aa7b-4dddb4be326751caacaa | |
| . . . | . . . | . . . | . . . |

In an authentication information management table illustrated in the table A, one record represents an entry of one piece of authentication information. A record of the table A is generated when the smartphone 103 registers the authenticator 330 in the mail-order service 310 of the server 102 and is added to the table A. An ID used for uniquely identifying each piece of authentication information is stored in an authentication information ID column. An ID used for uniquely identifying a service using an authentication function using biometric information is stored in a service ID column.

In this embodiment, as a service ID, a domain name of a service, in more detail, information of a top level domain and a second level domain is used. For example, in a case in which an URL of the mail-order service 310 is http://www.shopping-service.com, a service ID of the mail-order service 310 is shopping-service.com. In a secret key column, a secret key out of a generated pair of keys is stored. A public key corresponding to a secret key (forming a pair) is registered in a service represented in the service ID column.

In a biometric information ID column, an ID corresponding to a feature quantity of biometric information is stored. An order in which information corresponding to each column of the authentication information management table is stored and an order in which public keys are stored in a service will be described later. In this way, biometric information and a secret key generated for the biometric information are stored in association with each other. The authentication information management table represented in table A is one example and thus there is no limitation thereto and different information may be stored. For example, an ID used for uniquely identifying a user which a service uses for authentication for verifying matching of a conventional user ID and a password in respective services or the like may be stored.

In addition, the smartwatch 104 manages data similar to the authentication information management table of the table A. In more detail, the authentication information storing unit 353 of the authenticator 350 of the smartwatch 104 stores data similar to the authentication information management table of the table A in the TPM 226 and manages the data.

Next, various kinds of data managed by the server 102 will be described. Tables B to D are examples of data stored in the external memory 210 or an external storage system by the data storing unit 312 and the authenticator information storing unit 314 of the mail-order service 310 included in the server 102.

TABLE B

| User Id | Password | Name | Address | Telephone No. | Mail address | Payment information |
|---|---|---|---|---|---|---|
| user001 | *** | aaa aaa | abc | 000-000-000 | 001@aa.bb | *** |
| user002 | *** | bbb bbb | def | 000-000-111 | 002@aa.bb | *** |
| ... | ... | ... | ... | ... | ... | ... |

A user information management table illustrated in the table B is data managed by the data storing unit 312 of the mail-order service 310. In the user information management table, one record represents one piece of user information. In a user ID column, an ID used for uniquely identifying a user of the mail-order service 310 is stored. In a password column, a password used for authenticating a user is stored. A password is designated by a user when the user executes user registration for the mail-order service 310.

In addition, in the user information management table, information that is necessary for identifying a user, purchasing a product, sending a product, and the like such as a name, an address, a telephone number, a mail address, and payment information such as a credit card number of a user is stored. In the user information management table represented in the table B is one example, and attribute information relating to a user requested at the time of user registration such as an age, an occupation, and the like of the user may be additionally stored.

TABLE C

| Attestation challenge | User ID | Validity period |
|---|---|---|
| 65C9B063-9C33 | user001 | 2017-07-13T12:00:34Z |
| 7317EFBA-4E63 | user101 | 2017-07-13T12:03-12Z |
| ... | ... | ... |

An attestation challenge management table represented in a Table C is data managed by the data storing unit 312 of the mail-order service 310. In the attestation challenge management table, one record represents information of one attestation challenge. An attestation challenge is a parameter that is used as verification data for executing challenge response authentication and is issued for each user.

A process of issuing an attestation challenge will be described later. In an attestation challenge column, a value of an attestation challenge is stored. In a user ID column, a user ID of a user who has issued the attestation is stored. In a validity period column, a validity period of an attestation challenge is stored.

TABLE D

| Authentication information ID | Public key | User ID |
|---|---|---|
| 407c-8841-79d1 | AC43C5FB-BFA2-48D1-A71B-FB04ACDA347A | user001 |
| 407c-8841-88c2 | 8143CA9F-35C9-4333-948F-BFCE66A74310 | user001 |
| 4c04-428b-a7a2 | 8143CA9F-35C9-4333-948F-BFCE66A74310 | user002 |
| ... | ... | ... |

An authenticator information management table illustrated in the table D is data managed by the authenticator information storing unit 314 of the mail-order service 310. In the authenticator information management table, one record represents one piece of authenticator information. When registration of an authenticator 330 is executed in the server 102, a record is added to the authenticator information management table. The registration of the authenticator 330 is executed on the basis of registration information included in a credential generated by each terminal such as the smartphone 103 or the smartwatch 104.

In an authentication information ID column, a value of an authentication information ID column of the authentication information managed in the authentication information management table (table A) by the registered authenticator 330 is stored. In a public key column, a public key corresponding to a secret key (forming a pair) that is generated by the authenticator 330 and is managed in the authentication information management table (table A) is stored.

In other words, in the authentication information management table (table A) and the authenticator information management table (table D), in a secret key and a public key having the same value of an authentication information ID, data encrypted using the secret key of the table A can be decrypted using the public key of the table D. In a user ID column, an ID used for the mail-order service 310 to uniquely identify a user is stored. In an example illustrated in the table D, it can be understood that two pieces of authenticator information are registered for a user of which a user ID is "user001."

Next, various kinds of data managed by the voice assistant 105 will be described. Tables E to F are examples of data stored in an external memory or the like by the data storing unit 366 of the voice service 360 included in the voice assistant 105.

TABLE E

| User ID | Voiceprint information ID |
|---|---|
| user001 | c492a734 |
| user001-01 | b3bs4da1 |
| user002 | db2s2daa |
| ... | ... |

A voiceprint information management table represented in a table E is data that is managed by the data storing unit 366 of the voice service 360. In the voiceprint information management table, one record represents one piece of user information. In a user ID column, an ID used for uniquely identifying a user of the mail-order service 310 is stored. An ID corresponding to a feature quantity of voiceprint information of a user is stored in a voiceprint information ID column.

In this embodiment, although a case in which the user ID of the mail-order service 310 and the voiceprint information ID are managed by being associated with each other in the voiceprint information management table is described, the table may be configured such that the voiceprint information can be shared by other services. For example, a configuration may be employed in which the voice assistant prepares a ID used for uniquely identifying a user (common user ID), which is common to various services, and voiceprint information of a user and a user ID for each service are associated with the common user ID.

TABLE F

| User ID | Mobile terminal (Authenticator) | IP address | Priority level |
|---|---|---|---|
| user001 | a12345 | 111.11.11.11 | 1 |
| user001 | a23456 | 111.11.11.22 | 2 |
| user001-01 | a34567 | 111.11.11.33 | 1 |
| ... | ... | ... | ... |

An authenticator management table represented in a table F is data that is managed by the data storing unit 366 of the voice service 360. In the authenticator management table, a user ID of the mail-order service 310 and authenticators 330 and 350 registered in the mail-order service 310 are managed by being associated with each other in one record. Details of a process of registering the authenticators 330 and 350 in the mail-order service 310 will be described later.

In a user ID column, an ID used for uniquely identifying a user of the mail-order service 310 is stored. In addition, a plurality of authenticators 330 and 350 can be associated with one user ID. Information representing a priority level for use as an authentication device is assigned to each of the plurality of authenticators 330 and 350 associated with one user ID.

In a priority level column, information representing the priority level is stored. In an IP address column, an IP address of a terminal such as the smartphone 103 or the smartwatch 104 having an authenticator is stored. The stored information is not limited to an IP address and may be information used for communication between a mobile terminal having an authenticator and the voice assistant 105.

Figure 9:
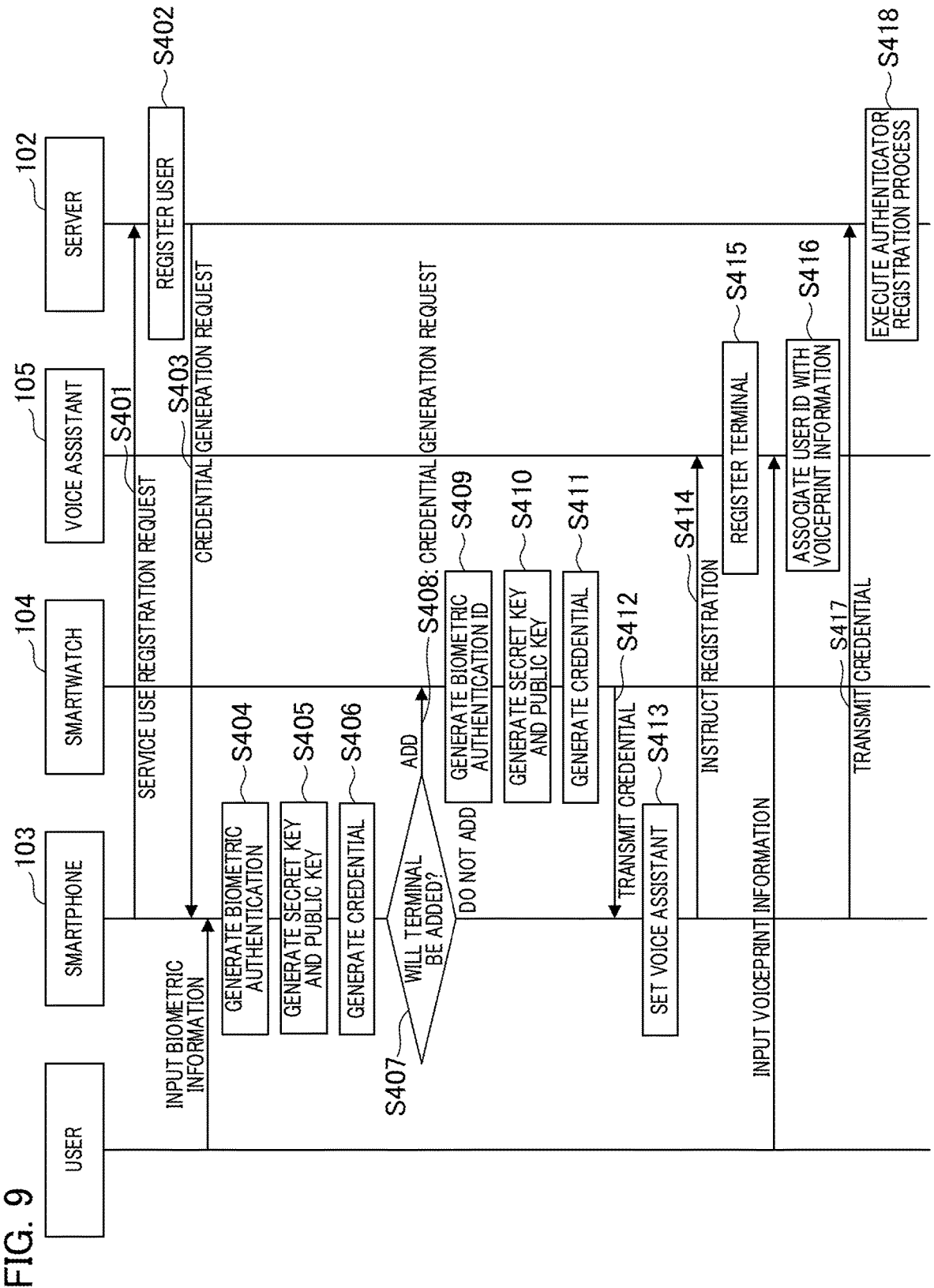
FIG. 9 is a diagram illustrating a service use registration process according to a first embodiment.

Next, a service use registration process executed when a user executes use registration of the mail-order service 310 will be described with reference to FIG. 9. By performing a process illustrated in FIG. 9 in a terminal, a user can use the mail-order service 310 using the terminal and can use the terminal as a device for authentication executed when the mail-order service 310 is used through the voice assistant. FIG. 9 is a diagram illustrating a sequence of a service use registration process using the smartphone 103 and the smartwatch 104, which are terminals, and the voice assistant 105 and the server 102.

Here, a user is assumed to have installed an application 320 linked with the mail-order service 310 in the smartphone 103 in advance. Alternatively, by designating an URL of a web service provided by the mail-order service 310 in a web browser inside the smartphone 103, a service screen for using the mail-order service 310 may be displayed.

Hereinafter, a case in which a user executes use registration using the application 320 of the smartphone 103 in the mail-order service 310 will be described. First, the application 320 of the smartphone 103 displays a user registration screen in accordance with a user's operation. More specifically, by operating a menu display (not illustrated in the drawing) of the application 320 or the like, the user registration screen is displayed.

Figure 14A:
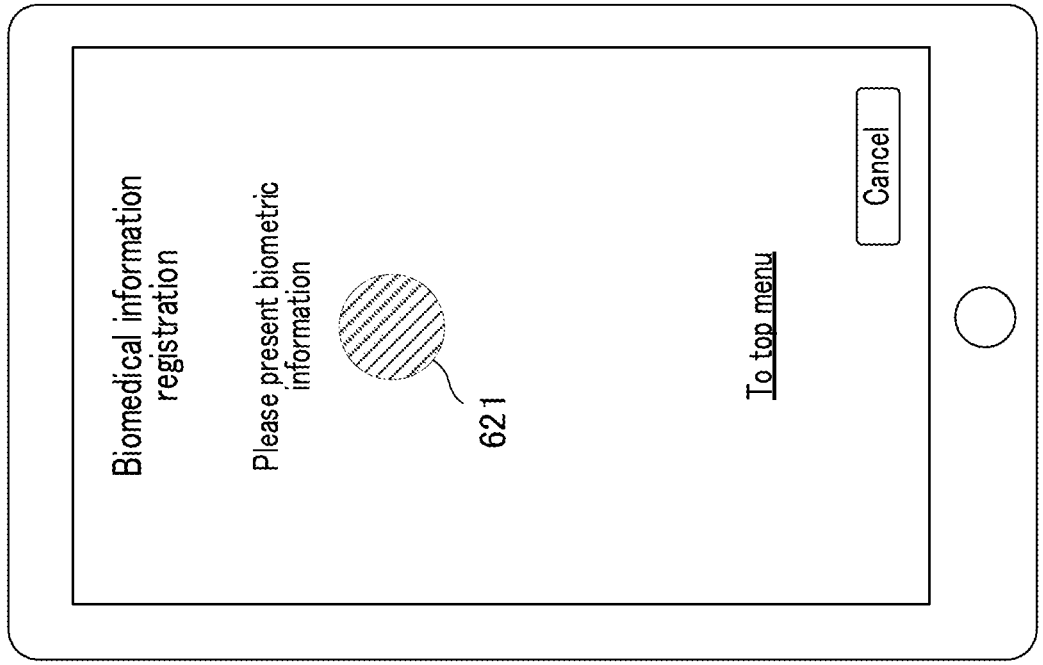
FIGS. 14A to 14D are one example of UIs of a terminal displayed in a service use registration process.

FIG. 14A is one example of the user registration screen displayed by the display unit 321 of the application 320. On the user registration screen, attribute information of a user that is necessary for use of the mail-order service 310 such as a name, an address, a telephone number, a mail address, and payment information including a credit card number of a user and a password used in the mail-order service 310 are input.

Description will be continued with reference to FIG. 9. In Step S401, when an input of user information is accepted, the application 320 transmits a use registration request of the mail-order service 310 of the user to the mail-order service 310 through the communication unit 322. In the request, attribute information and a password that have been input by the user are included. The communication unit 317 of the mail-order service 310 receives the request transmitted from the application 320 in Step S401.

In Step S402, the registration processing unit 311 of the mail-order service 310 issues a user ID and stores user information including the user ID in the user information management table (table B) of the data storing unit 312. In the user information, the attribute information and the password that has received in Step S401 are included. In Step S403, the authenticator information processing unit 313 of the mail-order service 310 transmits a credential generation request to the application 320 through the communication unit 317.

Hereinafter, parameters included in the credential generation request will be described. The parameters included in the credential generation request are composed of account information, an encryption parameter, an attestation challenge, and an authentication expansion area. In the account information, a user ID registered in Step S402 and attribute information associated with the user ID in the mail-order service 310 are stored.

In the encryption parameters, attribute information relating to authentication information to be registered such as encryption algorithm supported by the mail-order service 310 is stored. In the attestation challenge, verification data used for executing challenge response authentication is stored. The verification data, in other words, the attestation challenge is generated when a parameter included in the credential generation request is generated in Step S402.

Then, the generated attestation challenge is stored in the attestation challenge management table (table C) in association with a user ID, a validity period, and the like. In the authentication expansion area, an expansion parameter that can be designated by the mail-order service 310 is stored. For example, in the authentication expansion area, a parameter used for controlling the operation of the authenticator 330 and the like is stored.

Description will be continued with reference to FIG. 9. The communication unit 322 of the application 320 receives the credential generation request transmitted in Step S403. When the credential generation request is received, the display unit 321 of the application 320 displays a biometric information registration screen requesting the user to input biometric information.

Figure 14B:
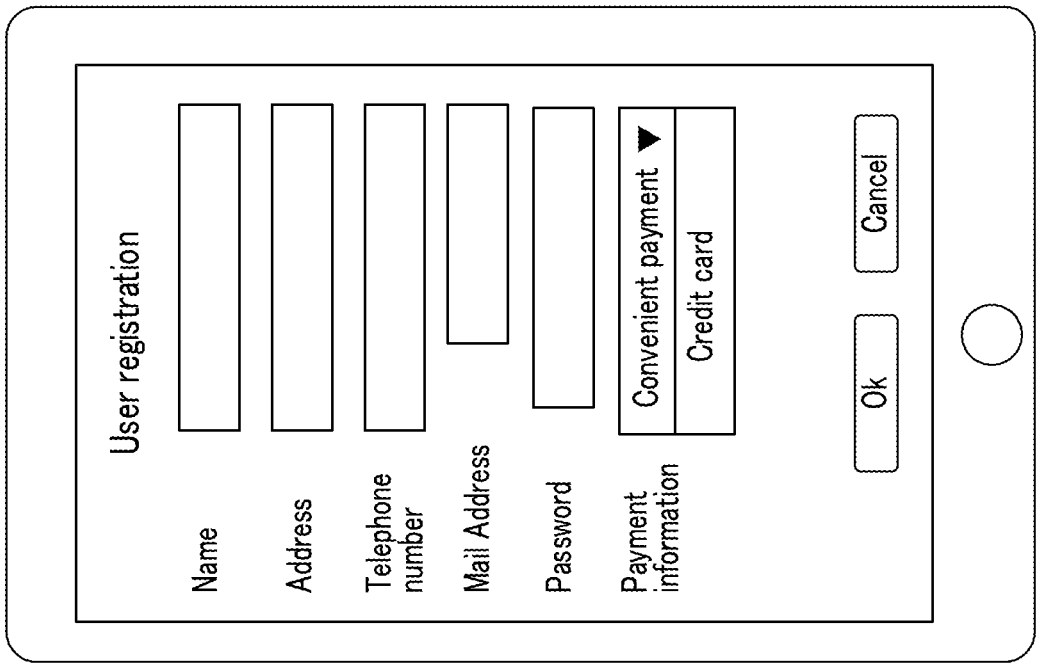

FIG. 14B is one example of a biometric information registration screen. On the biometric information registration screen, in order to register the authenticator 330 in the mail-order service 310, a user is prompted to input biometric information. A button 621 is a button for reading biometric information such as a fingerprint and includes the biometric information sensor 228. In addition, as the biometric information, information such as a vein, an iris, a voiceprint, and a face can be used, and the biometric information is not limited to any one thereof.

Here, the smartphone 103 is configured such that one piece of biometric information or an arbitrary combination of a plurality of pieces of biometric information is input as biometric information used for biometric authentication. On the biometric information registration screen, when biometric information is read by the biometric information sensor 228, the authenticator registration control unit 323 of the application 320 delivers the biometric information to the authenticator 330 and requests generation of a credential.

At this time, in the request, in addition to the read biometric information, a parameter included in the credential generation request received from the mail-order service 310 in Step S403 is included. In addition, a service ID may be included in the request. The service ID is an ID used for uniquely identifying a service of a registration target of the authenticator 330 described in the authentication information management table (table A). In such a case, a service ID of the mail-order service 310 is included.

Description will be continued with reference to FIG. 9. In Step S404, the biometric authentication processing unit 332 of the authenticator 330 generates a feature quantity of the biometric information received from the application 320 and a biometric information ID used for uniquely identifying the biometric information. The feature quantity of the biometric information is acquired by converting an object that is unique to an individual such as a pattern of a fingerprint, a shape of an iris, a form of a vein, or a voiceprint into a value not destroying the uniqueness. In the biometric authentication, an individual is identified using a feature quantity that is unique to the individual.

In Step S405, the authenticator registration processing unit 331 generates a pair of a secret key and a public key and an authentication information ID used for uniquely identifying the authentication information. Then, the authenticator registration processing unit 331 stores the following information in the authentication information management table (table A) stored in the TPM 226 through the authentication information storing unit 333. In other words, the biometric information ID generated in Step S404, the secret key and the authentication information ID generated in Step S405, and a service ID of a registration target of the authenticator 330 are stored.

In this embodiment, as the service ID, a service ID of the mail-order service 310 included in the credential generation request received by the authenticator 330 from the application 320 is stored. In Step S406, the authenticator registration processing unit 331 generates a credential.

Hereinafter, the credential will be described. The credential is composed of an authentication information ID, an algorithm, a public key, and an attestation. The authentication information ID is an authentication information ID that is generated in Step S405 and is stored in the authentication information management table (table A). In addition, the public key is a public key of the key pair generated in Step S405.

As the algorithm, an algorithm used when a key pair is generated in Step S405 is stored. In addition, the attestation is data acquired by encrypting an attestation challenge of a parameter included in the credential generation request received in Step S403 using the secret key generated in Step S405.

The authenticator registration processing unit 331 delivers the credential generated in Step S406 and the authenticator ID identifying its own authenticator 330 to the application 320. In Step S407, the display unit 321 of the application 320 displays a checking screen used for checking whether or not there is an additional terminal registering use of a service for the user.

Figure 14D:
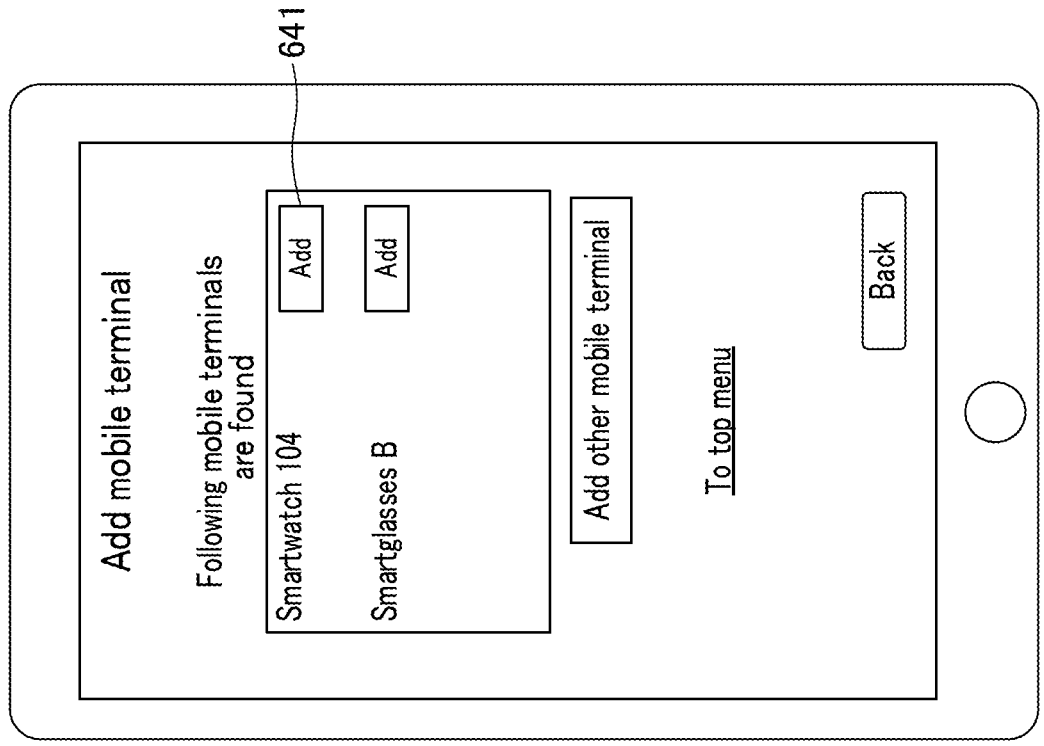
Figure 14C:
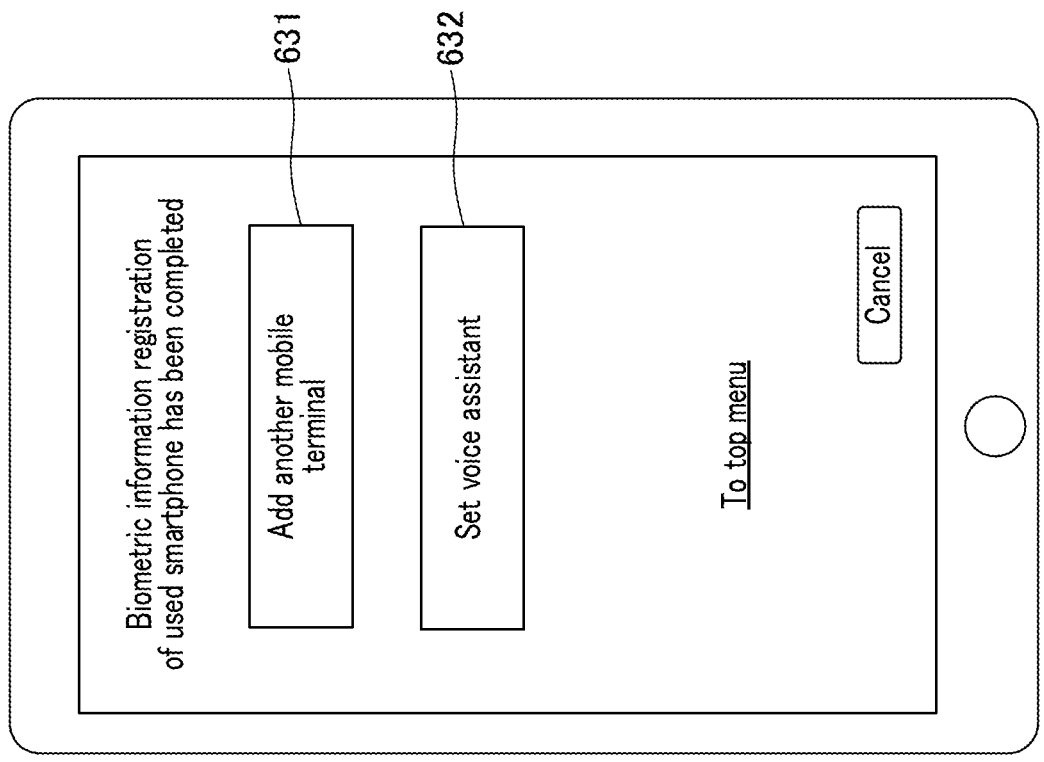

FIG. 14C is one example of the checking screen. On the checking screen, a message indicating completion of registration of biometric information in the smartphone 103 is displayed, and a user is allowed to select an operation to be executed next. More specifically, when the button 631 is pressed, another terminal can be added as a device for authentication (authentication device) when the service is used.

By adding a plurality of terminals as authentication devices, even in a case in which one terminal cannot be used due to the power being off or the like when the terminal receives an authentication request, authentication can be executed using another authentication device. When the button 632 is pressed, a setting for using the mail-order service 310 through the voice assistant 105 can be executed. A process executed in a case in which the button 632 is pressed will be described later.

Hereinafter, a process executed in a case in which the button 631 is pressed will be described. When the button 631 is pressed, the display unit 321 of the application 320 displays an additional registration screen that is used for additionally registering another terminal as an authentication device.

FIG. 14D is one example of an additional registration screen. On the additional registration screen, as terminals to be registered as authentication devices, for example, a wearable terminal paired with the smartphone 103 and other terminals detected by the smartphone 103 through a search are listed. A wearable terminal such as the smartwatch 104 is used after performing a process of being connected (paired) with the smartphone 103 in advance.

Accordingly, in a case in which a mail has been received in the smartphone 103 or a case in which a specific event has occurred in an application installed in the smartphone 103, or the like, the event can be notified to the smartwatch 104. In the example illustrated in FIG. 14D, a smartwatch 104 and smartglasses B are displayed as wearable terminals paired with the smartphone 103.

In addition, terminals displayed on the additional registration screen are not limited to terminals paired with the smartphone 103 as described above. For example, the communication unit 322 of the application 320 may search terminals disposed on the vicinity using proximity communication such as NFC or Bluetooth and display detected terminals in a list on the additional registration screen.

In addition, for example, a user may be allowed to input information relating to a terminal desired to be additionally registered as an authentication device. In such a case, information such as an IP address and the like of a terminal that is necessary for the smartphone 103 to communicate with the terminal is input. A button 641 is a button that is used for accepting an instruction of additional registration of a terminal corresponding to the button, that is the smartwatch 104 in the example illustrated in FIG. 14D.

Description will be continued with reference to FIG. 9. In Step S407, the display unit 321 of the application 320 determines whether the button 641 has been pressed on the checking screen. In other words, it is determined whether or not additional registration of an authentication device has been instructed. In a case in which additional registration of an authentication device has been instructed by pressing the button 641, the process proceeds to Step S408. On the other hand, in a case in which the button 641 has not been pressed, the process proceeds to Step S413. Here, description will be continued by assuming that the button 641 has been pressed.

In Step S408, the display unit 321 of the application 320 transmits a credential generation request to an application 340 of the corresponding smartwatch 104 through the communication unit 322. When the credential generation request transmitted in Step S408 is received, the communication unit 342 of the application 340 reads biometric information using the biometric information sensor 228 included in the smartwatch 104. In this embodiment, the smartwatch 104 uses vein pattern information as the biometric information.

The authenticator registration control unit 343 of the application 340 included in the smartwatch 104 delivers the biometric information read by the biometric information sensor 228 to the authenticator 350 of the smartwatch 104. Then, the authenticator registration control unit 343 requests the authenticator 350 to generate a credential.

A process of Steps S409 to S411 using the authenticator 350 of the smartwatch 104 is similar to the process of Steps S404 to S406 using the authenticator 330 of the smartphone 103, and thus description thereof will not be presented here. The authenticator registration processing unit 351 of the authenticator 350 delivers the following information to the application 340. In other words, the credential generated in Step S411 and an authenticator ID identifying its own authenticator 350 are delivered.

In Step S412, the communication unit 342 of the application 340 transmits the credential received in Step S411 and the authenticator ID identifying the authenticator 350 to the application 320 of the smartphone 103. The process of Steps S408 to S412 is repeated for each terminal executing additional registration as an authentication device.

When there is no terminal desired to be additionally registered as an authentication device, by pressing a "Back" button on the additional registration screen (FIG. 14D) or the like, the screen is returned to the checking screen illustrated in FIG. 14C. Then, a setting of the next voice assistant 105 is executed. The voice assistant 105 is used after it is connected (paired) with a PC or a smartphone 103. In this way, an additional function can be installed in the voice assistant using the PC or the smartphone paired with the voice assistant.

Hereinafter, a process executed in a case in which the button 632 is pressed will be described. When the button 632 is pressed, a process of Step S413 illustrated in FIG. 9 is executed. In Step S413, the smartphone 103 executes a setting for using a mail-order service for the paired voice assistant 105.

In more details, when the button 632 illustrated in FIG. 14C is pressed, the communication unit 322 instructs installation of an additional function for the mail-order service 310 by communicating with the voice assistant 105 paired with the smartphone 103. The voice service 360 of the voice assistant 105 can use the mail-order service 310 by installing an additional function.

In Step S414, the display unit 321 of the application 320 registers a terminal set as an authentication device in the voice assistant 105. More specifically, at this time, the display unit 321 of the application 320 transmits the following information to the voice assistant 105. The user ID issued in Step S402, information for specifying the smartphone 103, and information for specifying a terminal instructed to be additionally registered in the process of Step S407 and subsequent steps are transmitted.

The information used for specifying the smartphone 103 and the terminal of which the additional registration is instructed includes information used for the voice assistant 105 to communicate with each terminal such as an IP address of the terminal or the like. In Step S415, the data storing unit 366 of the voice service 360 stores (registers) various kinds of information received through the communication unit 365 in the authenticator management table (table F) in Step S414.

In addition, in Step S415, the voice assistant 105 may execute conduction check toward each terminal that is a registration target. In a case of a failure in the conduction check, for a corresponding terminal, an error is returned to the smartphone 103 without storing the information thereof in the authenticator management table. In addition, a priority level of execution of an authentication request for each terminal that is a registration target is registered in the authenticator management table.

The priority level, for example, may be set on a screen (not illustrated in the drawing) of the smartphone 103 by a user or may be automatically determined in accordance with a type of each terminal. For example, it is conceivable to set a wearable device having a high likelihood of being worn by a user in the body as having priority over a smartphone. In addition, the priority level may be dynamically changed. For example, it is conceivable to raise a priority level of a terminal that actually executed authentication when an authentication request was previously executed.

When the process of Step S415 is completed, the voice assistant 105 is in a state in which registration of user's voiceprint information is accepted. The speech generating unit 363 of the voice service 360 notifies a user of an indication thereof using speech. For example, the speech generating unit 363 gives a notification using speech "Voiceprint information is being registered. Please talk!," thereby prompting the user to input biometric information. When the user speaks to the voice assistant 105, and the voice receiving unit 361 receives a voice from the user, the voice analyzing unit 362 generates an ID corresponding to a feature quantity of the voiceprint information of the user in Step S416.

Then, the data storing unit 366 stores the generated voiceprint information ID and a user ID that has been issued in Step S402 and received in Step S414 in the voiceprint information management table (table E) in association with each other. In a case in which the voice assistant 105 is installed at the own house and is not considered as being used by another person, the registration of voiceprint information may be omitted. In a case in which the registration of voiceprint information is omitted, only a user ID is stored in the voiceprint information management table (table E).

In Step S417, the communication unit 322 of the application 320 transmits a credential and an authenticator ID to the mail-order service 310 and issues a request for registration. The credential transmitted here is the credential generated in Step S406 and Step S411. In addition, the authenticator ID transmitted here is the authenticator IDs specifying the authenticators 330 and 350 of which the credentials were generated in Step S406 and Step S411.

In this embodiment, a case in which a credential and an authenticator ID generated by each of the smartphone 103 and the smartwatch 104 are transmitted together has been described. However, the transmission thereof is not limited thereto, and, for example, after use registration is executed in a certain smartphone 103, in a case in which another terminal that is an individual authentication device is added, a credential and an authenticator ID may be transmitted at different timings.

In Step S418, the authenticator information processing unit 313 of the mail-order service 310 executes an authenticator registration process using the received credential. This process is executed for each credential received in Step S417.

Hereinafter, the authenticator registration process executed by the authenticator information processing unit 313 will be described. First, the authenticator information processing unit 313 decrypts an attestation included in the credential using a public key included in the same credential and verifies that the registration request is not an unauthorized registration request.

In addition, the authenticator information processing unit 313 specifies a record in an attestation challenge column having the same value as the value acquired by decrypting the attestation using the public key in the attestation challenge management table (table C). Then, the authenticator information processing unit 313 sets a user ID of the specified record as a user ID associated with the credential.

Then, the authenticator information processing unit 313 stores (registers) the authentication information ID and the public key included in the credential and the user ID associated with the credential in the authenticator information management table (table D). Finally, the communication unit 317 of the mail-order service 310 notifies the application 320 of the smartphone 103 that use of a service has normally been registered.

Figure 12:
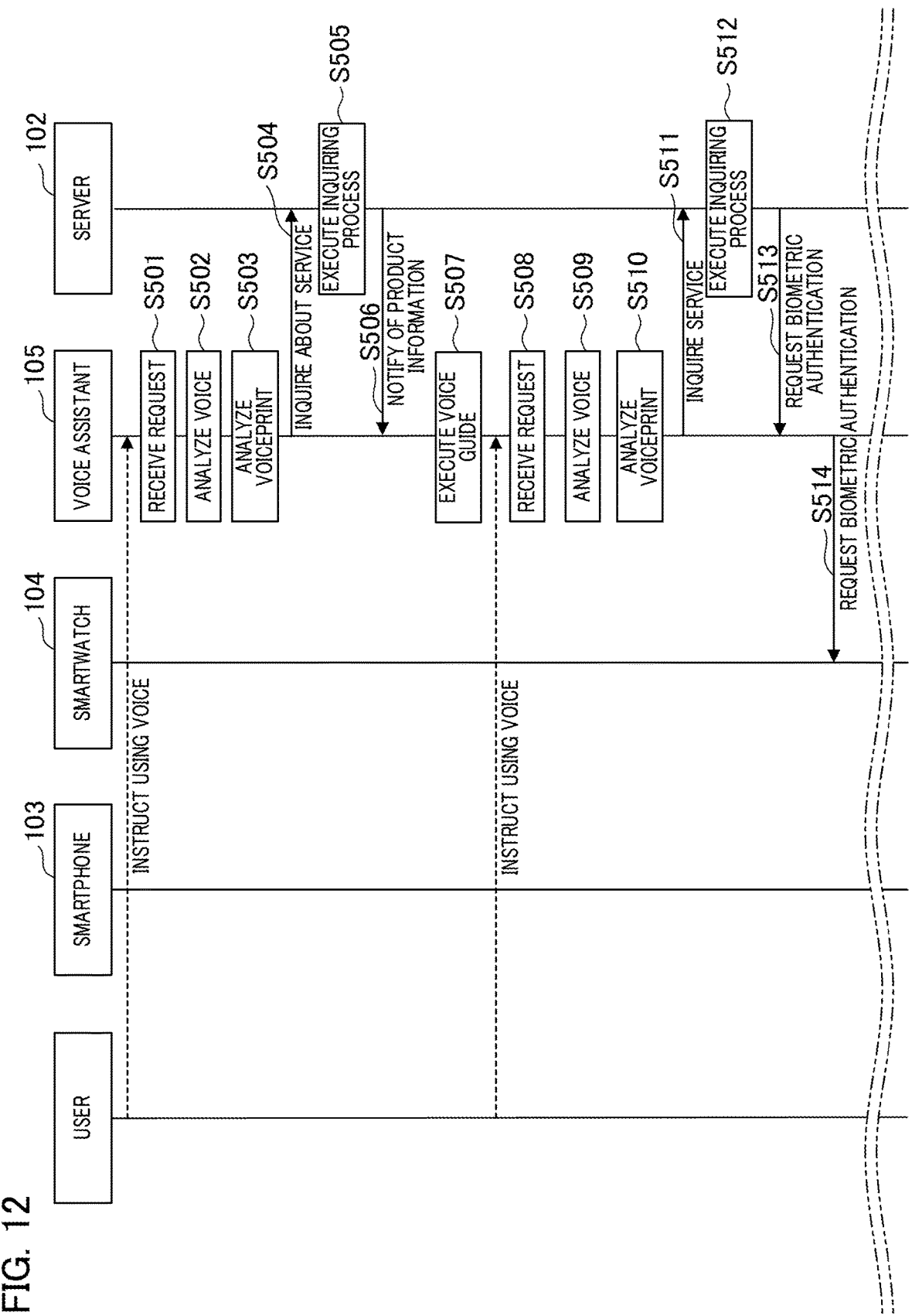
FIG. 12 is a diagram illustrating a process performed when a service according to the first embodiment is used.
Figure 13:
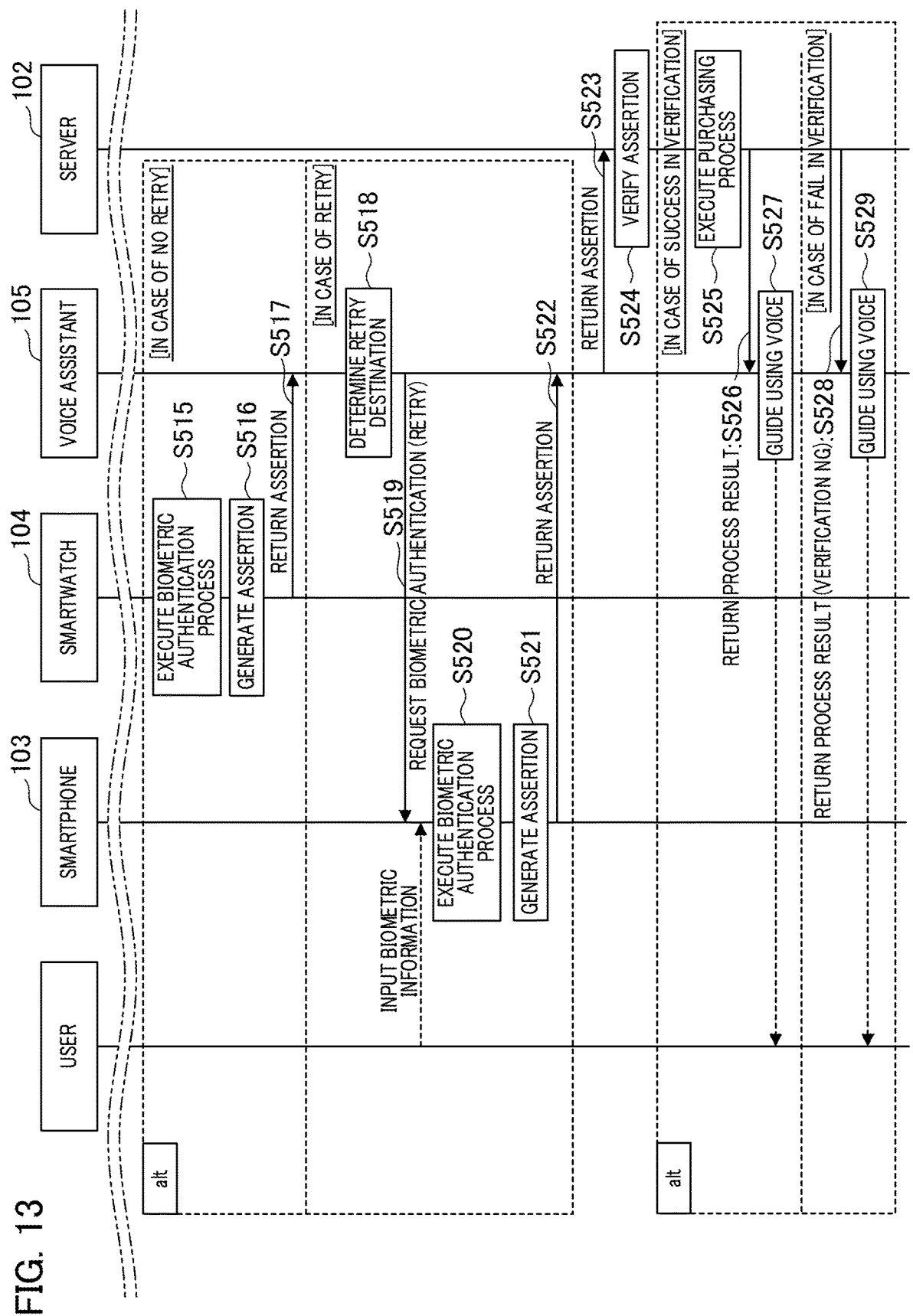
FIG. 13 is a diagram illustrating a process performed when a service according to the first embodiment is used.

Next, a process in which a user uses the mail-order service 310 through the voice assistant 105 will be described with reference to FIGS. 12 and 13. FIGS. 12 and 13 are diagrams illustrating a sequence of a process executed when a service is used by the smartphone 103, the smartwatch 104, the voice assistant 105, and the server 102.

The user transmits a use request of the mail-order service 310 to the voice assistant 105 using speech generation (voice). For example, a search for specific product information using the mail-order service 310 or the like is requested. Here, the search for product information is one example of a service provided by the mail-order service 310 and but is not limited thereto.

In Step S501, the voice receiving unit 361 of the voice service 360 included in the voice assistant 105 receives the use request for the service using the voice from the user. In Step S502, the voice analyzing unit 362 determines a content of the request by analyzing the received voice. In Step S503, the voice analyzing unit 362 executes a voiceprint analysis for the received voice, generates an ID corresponding to a feature quantity of the voiceprint information of the user, and temporarily stores the generated ID.

In Step S504, the communication unit 365 transmits the process request analyzed in Step S502 to the mail-order service 310. The communication unit 317 of the mail-order service 310 receives a request from the voice assistant 105. In Step S505, the service processing unit 316 of the mail-order service 310 executes a process according to the received request. In more details, first, the service processing unit 316 determines whether or not user authentication is necessary in a case in which the received request is executed. The necessity/non-necessary of user authentication is set in advance when information relating to a service is registered in the mail-order service 310.

For example, a request for a product purchase accompanying payment and the like are set as user authentication being necessary. On the other hand, a search for a product may be set as user authentication being unnecessary. In a case in which the service processing unit 316 determines that user authentication is unnecessary in a case in which the request is executed, a process according to the request is executed without requesting user authentication. Here, a case in which a content of the request is a search for a specific product will be described.

The request of a search for a specific product is not a request accompanying payment, and accordingly, the service processing unit 316 determines that user authentication is unnecessary. Then, the service processing unit 316 executes a search for a specific product as a process according to the request and, in Step S506, returns product information such as the price of the product and a product number to the voice assistant 105 through the communication unit 317. In addition, a process executed in a case in which user authentication is necessary will be described in Step S512 and subsequent steps.

The communication unit 365 of the voice service 360 receives product information from the mail-order service 310. In Step S507, the speech generating unit 363 of the voice service 360 guides the user about the received product information using speech. In addition, the user requests the voice assistant 105 to purchase a specific product using speech generation (voice). The process of Steps S508 to S511 in which the voice assistant 105 that has received a request transmits the user's request to the mail-order service 310 is similar to the process of Steps S501 to S504, and thus, description thereof will not be presented here.

In Step S512, the service processing unit 316 of the mail-order service 310 determines whether or not user authentication is necessary in a case in which the request received through the communication unit 317 is executed. Here, since a content of the request is a request accompanying payment, the service processing unit 316 determines that user authentication is necessary. Thus, in Step S513, the authenticator information processing unit 313 of the mail-order service 310 requests the voice assistant 105 to execute user authentication, in other words, biometric authentication through the communication unit 317. At this time, the authenticator information processing unit 313 generates a biometric authentication parameter and includes the generated biometric authentication parameter in the request.

Hereinafter, the biometric authentication parameter will be described. The biometric authentication parameter is data that is used when the mail-order service 310 executes authentication of the application 320. The biometric authentication parameter is composed of an assertion challenge and an assertion expansion area.

In the assertion challenge, verification data used for executing challenge response authentication is stored. In the assertion expansion area, an expansion parameter, which can be designated by the mail-order service 310, used by the mail-order service 310 for controlling the operation of the authenticator 330 and the like is stored.

Description will be continued with reference to FIG. 12. When the voice assistant 105 receives a request for biometric authentication in Step S513, the biometric authentication control unit 364 of the voice service 360 acquires a user ID associated with the user's voiceprint information ID temporarily stored in Step S510 from the voiceprint information management table (table E).

In addition, as described above, in a case in which registration of the voiceprint information is omitted in the voice assistant 105 such as a case in which the voice assistant 105 is installed at the own house, and use from another person is not considered, a voiceprint analysis is not executed in Step S510. In such a case, the biometric authentication control unit 364 may acquire a user ID stored in the voiceprint information management table (table E).

In Step S514, the biometric authentication control unit 364 specifies an authenticator (terminal) to execute a request for biometric authentication using the authenticator management table (table F). In more details, in the authenticator management table (table F), a terminal having the highest priority level out of the authenticators 330 and 350 associated with the user ID is specified as an authentication device.

In this embodiment, in the authenticator management table (table F), it is assumed that the smartphone 103 and the smartwatch 104 are registered, and a priority level of the smartwatch 104 is highly set. The biometric authentication control unit 364 requests a terminal having the highest priority level, in this embodiment, the smartwatch 104 to execute biometric authentication through the communication unit 365. In the request, an Auth biometric authentication parameter is included.

Hereinafter, the Auth biometric authentication parameter will be described. The Auth biometric authentication parameter includes the biometric authentication parameter that is generated by the authenticator information processing unit 313 of the mail-order service 310 in Step S513 described above and is transmitted from the mail-order service 310 to the voice assistant 105. In addition, the Auth biometric authentication parameter includes a service ID and a web origin.

In the service ID, information of a top level domain and a second level domain of the mail-order service 310 is stored. For example, in a case in which a URL of the mail-order service 310 is https://www.shopping-service.com," the services ID is shopping-service.com. The web origin is a combination of a protocol, a host name, and a port and, in this embodiment, an origin of the mail-order service 310 is stored therein.

Description will be continued with reference to FIG. 12. In Step S515, as described above, the smartwatch 104 that has received a request for biometric authentication from the voice assistant 105 executes a biometric authentication process. In addition, the smartwatch 104 may automatically execute vein pattern authentication in a case in which a user wears the smartwatch 104 in the body when the request for biometric authentication is received. Hereinafter, the biometric authentication process executed by the smartwatch 104 will be described. Hereinafter, although the smartwatch 104 as a terminal executing the biometric authentication process will be described, the description similarly applies also to a case in which the smartphone 103 and other terminals execute a biometric authentication process.

When a request for biometric authentication is received by the smartwatch 104, the biometric authentication processing unit 352 of the authenticator 350 automatically reads biometric information using the biometric information sensor 228. In this way, in the case of a wearable terminal having a function capable of automatically executing biometric authentication, there is no need for a user explicitly presenting biometric information, and biometric information is automatically read. Hereinafter, automatically reading biometric information and executing biometric authentication will be referred to as automatic authentication.

The biometric authentication processing unit 352 acquires a feature quantity of user's biometric information and specifies a record from the authentication information management table (table A) managed by the authentication information storing unit 353 on the basis of the acquired feature quantity. More specifically, by specifying a biometric information ID represented by the feature quantity, an authentication information ID and a secret key corresponding to the biometric information are specified in the authentication information management table (Table A).

In other words, the authenticator 350 executes biometric authentication and a secret key is extracted in the case of an authentication success. In addition, in the table A, not only the feature quantity but a match of a service ID included in the Auth biometric authentication parameter may be verified. Then, in Step S516, the biometric authentication processing unit 352 generates signature data by encrypting an assertion challenge included in the Auth biometric authentication parameter using the specified secret key.

In addition, the biometric authentication processing unit 352 generates assertion information including the specified authentication information ID and the generated signature data. In Step S517, the biometric authentication processing unit 352 returns the generated assertion information to the voice assistant 105.

On the other hand, in Step S514, in a case in which the voice assistant 105 transmits a request for biometric authentication, there may be a case which the user does not wear the watch in the body, a case in which power of the smartwatch 104 is off, ante he like. In such cases, time-out is acquired without presenting biometric information even when a predetermined time has elapsed, and the request for biometric authentication of Step S514 fails. In addition, the authenticator 350 of the smartwatch 104 executes biometric authentication, and, also in the case of an authentication failure, the request for biometric authentication of Step S514 fails.

In this way, in a case in which a predetermined condition is satisfied for a request for biometric authentication such as the case of an authentication failure including a case in which biometric information is not presented even when a predetermined time elapses, the biometric authentication control unit 364 of the voice service 360 determines that the request for biometric authentication has failed. In addition, also in a case in which, although authentication is successful on the user terminal side such as the smartwatch 104, the signature data described above cannot be received within a predetermined time by the voice assistant 105 due to a problem of the network or the like, it is determined that predetermined condition is satisfied.

In a case in which the request for biometric authentication has failed, the process proceeds to Step S518, and the biometric authentication control unit 364 determines a terminal that is a retry destination of the biometric authentication. In more details, in Step S514, the biometric authentication control unit 364 determines a terminal having the second highest priority level next to the authenticator (terminal) that is requested to execute biometric authentication specified using the authenticator management table (table F) as a retry destination.

In this embodiment, although a retry destination is determined in order according to a priority level in the authenticator management table (table A), the order is not limiter thereto. For example, when an authenticator is registered in the authenticator management table (table F), a terminal that is a parent among terminals corresponding to each authenticator is set.

A terminal that is a parent is assumed to be able to communicate with other terminals and acquire statuses of the other terminals. For example, the smartphone 103 is registered as a parent, and the smartwatch 104 and the other wearable terminals such as smartglasses and the like are registered as children. Then, the smartphone 103, for example, acquires the statues of children terminals using the following method.

For example, the smartphone 103 acquires power states of terminals by periodically communicating with the terminals such as the smartwatch 104 and the like with which the smartphone is paired. In addition, for example, the smartphone 103 may set such that it receives data of the pulse that is regularly measured by the smartwatch 104. In a case in which the data of the pulse is not transmitted from the smartwatch 104, the smartphone 103 can determine that the user is not currently wearing the smartwatch 104 in the body.

Then, in Step S518, when an inquiry of the status of each terminal that is a child is received from the voice assistant 105, the smartphone 103 returns an indication representing that the smartwatch 104 is currently unusable as a response to the inquiry. In such a case, the voice assistant 105 skips the smartwatch 104 in the priority levels of the authenticator management table (table A) and requests a terminal having the highest priority level next thereto to execute biometric authentication.

In this way, a terminal that is a retry destination can be determined without waiting for time-out of a request. In addition, in this way, in a case in which there is a terminal that is a parent, instead of requesting a terminal, which executes biometric authentication, to execute the biometric authentication from the voice assistant 105, a request for biometric authentication may be directly issued from the smartphone 103 that is a parent to each terminal.

In Step S519, the biometric authentication control unit 364 of the voice service 360 requests a terminal having the highest priority level next thereto, in this embodiment, the smartphone 103 to execute biometric authentication. When the request for biometric authentication is received by the smartphone 103, the display unit 321 of the application 320 displays a biometric information input request screen (not illustrated in the drawing).

When biometric information is presented by the user on the input request screen, the biometric information sensor 228 reads the biometric information. After the biometric information is read, processes of Steps S520 to S522 executed by the smartphone 103 are similar to the processes of Steps S515 to S517 executed by the smartwatch 104, and thus, description thereof will not be presented here.

In Step S523, the communication unit 365 of the voice service 360 returns the assertion information received in Step S517 or S522 to the mail-order service 310. In addition, in a case in which a result of the biometric authentication process of Step S520 is an authentication failure in the terminal that is a retry destination, here, the smartphone 103, the smartphone 103 executes the following process in Step S522. In other words, the smartphone 103 returns information indicating that the result of the biometric authentication process is an authentication failure to the voice assistant 105.

A case in which a result of the biometric authentication process is a failure also includes the following cases. In other words, a case in which there is no response from a terminal even when a predetermined time has elapsed for a request for biometric authentication such as a case in which biometric information is not presented from the user even when a predetermined time elapses or a case in which power of a terminal executing the biometric authentication process is off is included therein. The voice assistant 105 that has received information indicating that a result of the biometric authentication process is an authentication failure requests a terminal having the highest priority level next thereto in accordance with the priority level of the authenticator management table (table A) to execute biometric authentication.

Then, in a case in which authentication failures are acquired in all the terminals registered as retry destinations, the voice assistant 105 notifies the user of an indication representing a failure in the biometric authentication using speech. In addition, the voice assistant 105 returns information representing a failure in the biometric authentication to the mail-order service 310 in Step S523. When the information representing an authentication failure is received, the mail-order service 310 ends the process illustrated in FIGS. 12 and 13.

In Step S524, the authenticator information processing unit 313 of the mail-order service 310 verifies the assertion information received in Step S523. More specifically, the authenticator information processing unit 313 verifies whether or not the signature data included in the assertion information matches the assertion challenge included in the authentication parameter that is generated and transmitted in Step S513.

In the verification, the signature data included in the assertion information is decrypted using a public key specified by the authentication information ID included in the assertion information. In the specifying of the public key, the authenticator information management table (table D) is used. Then, it is verified whether or not the decrypted value matches the assertion challenge included in the biometric authentication parameter that is generated and transmitted in Step S513.

In a case in which the decrypted value matches the assertion challenge included in the biometric authentication parameter that is generated and transmitted in Step S513, the process proceeds to Step S525. In Step S525, the service processing unit 316 of the mail-order service 310 provides a service according to the request received in Step S511, here, executes a product purchasing process.

Then, in Step S526, the service processing unit 316 returns an acceptance result of the request for the use of a service received from the voice assistant 105 in Step S508 to the voice assistant 105. In Step S527, the speech generating unit 363 of the voice service 360 notifies the user of the acceptance result received in Step S526 using speech.

On the other hand, in Step S524, in a case in which the decrypted value does not match the assertion challenge included in the biometric authentication parameter that is generated and transmitted in Step S514, the process proceeds to Step S528. In Step S528, the service processing unit 316 of the mail-order service 310 returns information indicating a failure of the user authentication to the voice assistant 105. Then, the service processing unit 316 ends the process.

In Step S529, in a case in which the information indicating a failure of the user authentication is received, the speech generating unit 363 of the voice service 360 notifies the user of no-execution of the request received in Step S508 through a voice. In addition, in a case in which authentication requests have failed in all the terminals registered as retry destinations, the voice assistant 105 may allow a user to request authentication using a user ID and a password.

In such a case, the voice assistant 105 requests a terminal such as the smartphone 103 from which a user ID and a password can be manually input among the terminals registered as the retry destinations to input the user ID and the password. In this way, in order to specify a terminal from which a manual input can be made, for example, in the service use registration process illustrated in FIG. 9, the data storing unit 366 of the voice service 360 stores types of terminals together in the authentication management table (table F).

However, in Steps 514 and S519, there is a high likelihood of the occurrence of communication error even when a terminal having no response due to communication error for the execution of one request for biometric authentication is request to execute the biometric authentication again. For this reason, the terminal may be not set as a retry destination, and the request may not be made again for the terminal. In other words, only in a case in which time-out is acquired due to no presentation of biometric information for a request for biometric authentication or a case in which a result of the biometric authentication process is an authentication failure, a request for biometric authentication may be made gain for the corresponding terminal.

In this embodiment, although a case in which the authenticator management table (table F) included in the voice assistant 105 is used as information of authentication devices for determining a retry destination has been described, the configuration is not limited thereto. For example, a similar table may be configured to be included in the mail-order service 310.

In such a case, the processes of Steps S513 and S519 are not executed, and a request for biometric authentication from each authentication device is directly made from the mail-order service 310 to each authentication device not through the voice assistant 105. In addition, the process of Step S518 in which a retry destination is determined is executed not by the voice assistant 105 but by the server 102.

In this way, according to this embodiment, in a case in which the mail-order service 310 is used through the information processing apparatus such as the voice assistant 105, a system that provides a secured authentication system using a terminal for authentication and improves user's convenience can be realized. For example, in a case in which the mail-order service 310 is used through the voice assistant, not only authentication using voiceprint information but also biometric authentication using an authentication device can be executed.

For example, in a case in which the mail-order service 310 is used through the voice assistant 105, it may be assumed that the voice assistant 105 executes authentication, and voiceprint is used as authentication information. A user inputs a request for service use to the voice assistant 105 using speech, and the voice assistant 105 executes voice print authentication using the voice input by the user. However, there are cases in which an accuracy of individual authentication is lower than that of the fingerprint authentication or the vein pattern authentication. Even in such cases, in this embodiment, for executing more accurate authentication, fingerprint authentication or vein pattern authentication can be used in an authentication device.

In addition, for example, even in a case in which a fingerprint authentication function or a vein pattern authentication function is mounted in the voice assistant, when a user moves from a far position to a position close to the voice assistant 105 at which an instruction can be made using speech, it is necessary to execute biometric authentication, which is inconvenient. However, according to this embodiment, a wearable terminal is used as an authentication device, and biometric authentication can be automatically executed with the wearable device held by the user, whereby user's efforts can decrease. In addition, in a case in which the wearable terminal is not held by the user, a case in which the power thereof is off, or the like, another terminal registered in advance is automatically requested to execute authentication, and accordingly, the user's convenience can be improved with additionally increasing communication.

Modified Example of First Embodiment

Figure 10:
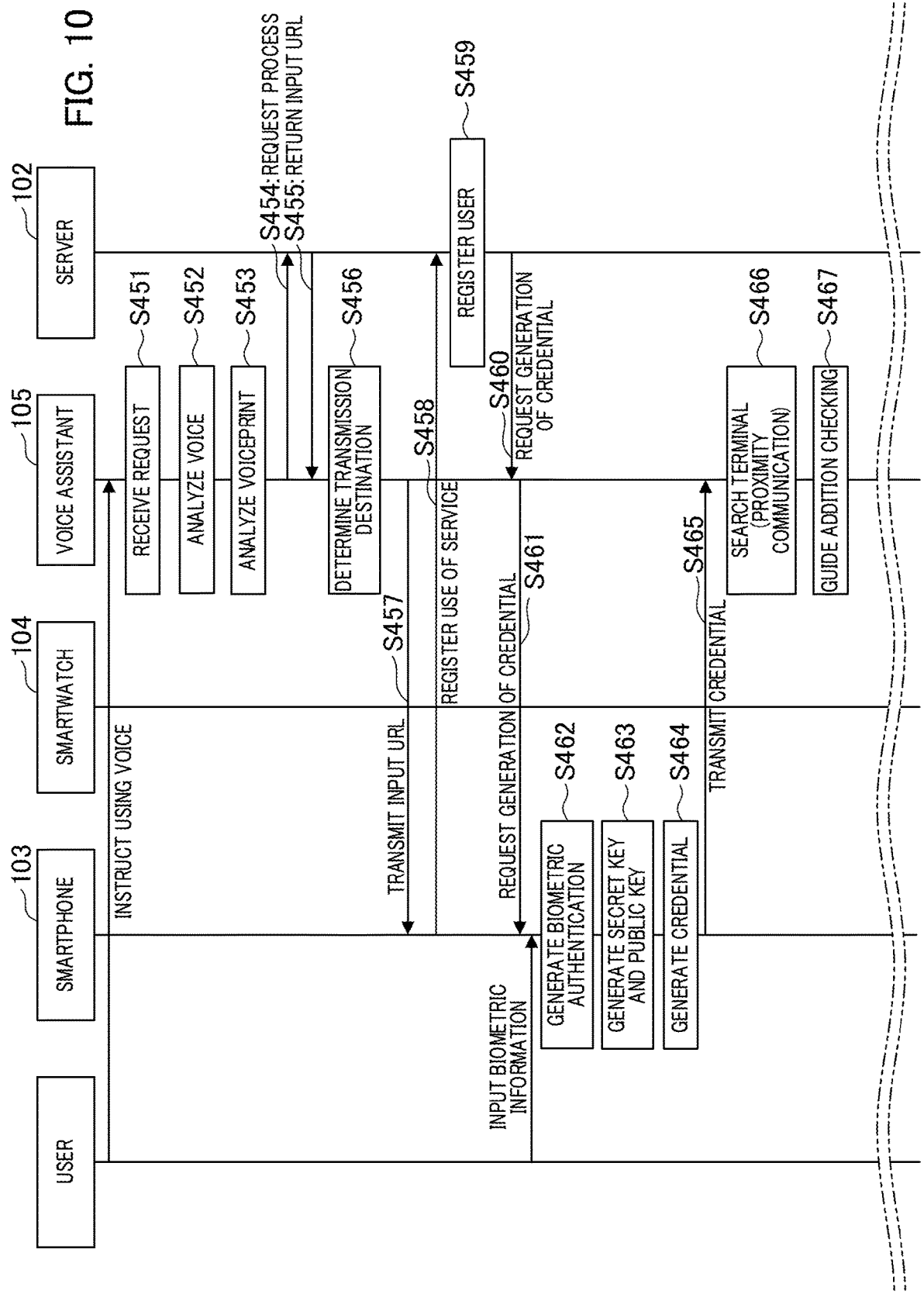
FIG. 10 is a diagram illustrating a service use registration process according to a modified example of the first embodiment.
Figure 11:
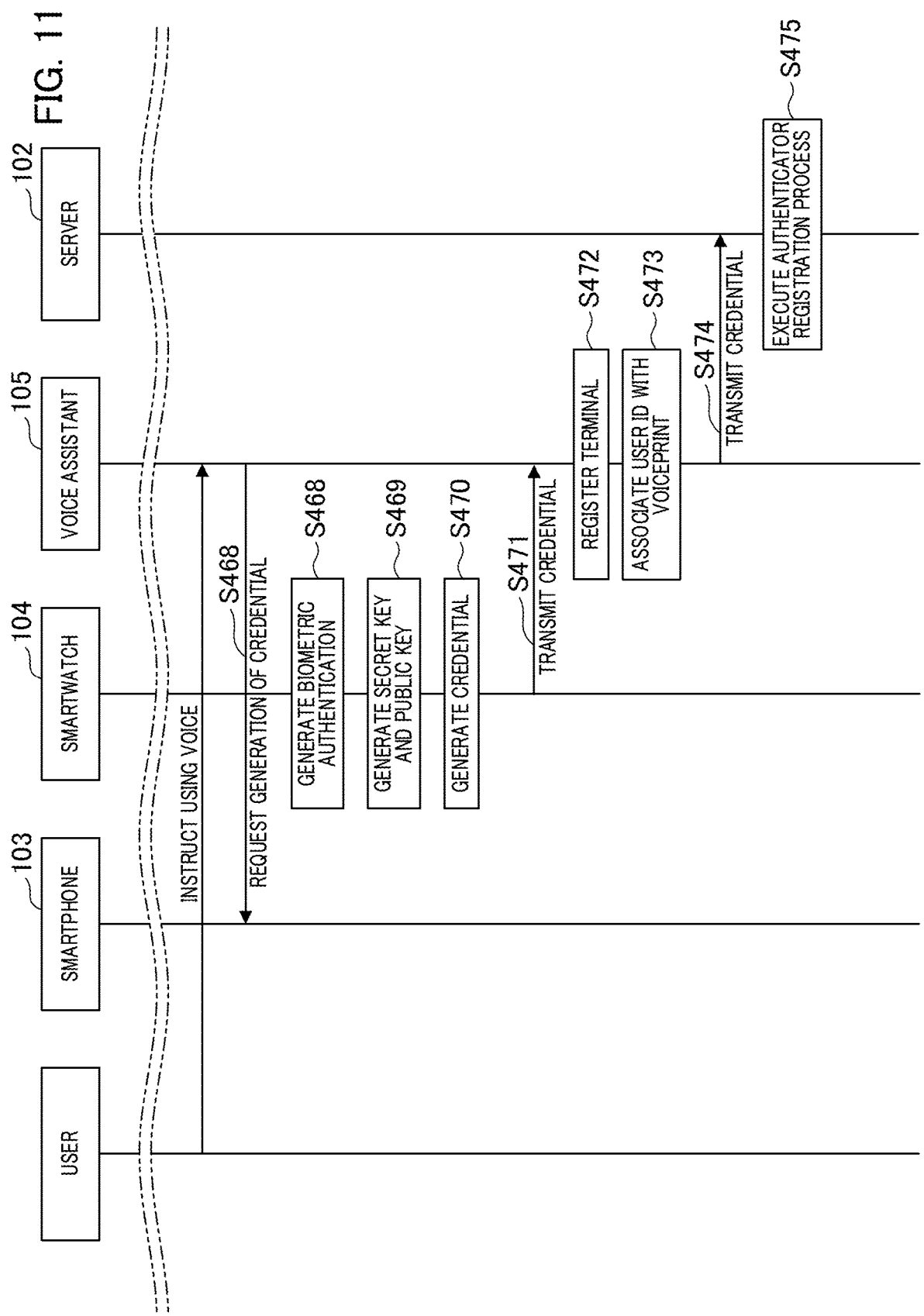
FIG. 11 is a diagram illustrating a service use registration process according to a modified example of the first embodiment.

Next, a modified example of the service use registration process (FIG. 9) according to the first embodiment will be described with reference to FIGS. 10 and 11. In the first embodiment, the smartphone 103 executes use registration thereof for the server 102 and relays use registration of other terminals. In contrast to this, in this modified example, the voice assistant 105 relays use registration of each terminal.

When a user transmits a request for use registration in the mail-order service 310 to the voice assistant 105 using speech generation (voice), in Step S451, the voice receiving unit 361 of the voice service 360 receives the request for use registration from the user using speech. In Step S452, the voice analyzing unit 362 analyzes the received voice and determines a content of the request. In Step S453, the voice analyzing unit 362 executes voiceprint analysis of the received voice, generates an ID corresponding to a feature quantity of the user's voiceprint information, and temporarily stores the generated ID.

In Step S454, the communication unit 365 transmits a process request analyzed in Step S452 to the mail-order service 310. The communication unit 317 of the mail-order service 310 receives a request from the voice assistant 105. In Step S454, the service processing unit 316 of the mail-order service 310 executes a process according to the received request. Details of the process are similar to those of Steps S505 and S512 illustrated in FIG. 12 described in the first embodiment, and description thereof will not be presented here.

In Step S455, the service processing unit 316 returns a URL (input URL) used for displaying a screen used for inputting user information to the voice assistant 105 through the communication unit 317 as a process according to the request. In addition, the service processing unit 316 includes information used for associating a use registration request from the smartphone 103 with a process request transmitted from the voice assistant 105 in Step S454 to be described later in the returned data. For example, information used for specifying the voice assistant 105 that is a request source is included in a parameter of the input URL.

In Step S456, the biometric authentication control unit 364 of the voice service 360 determines a terminal to which the input URL is transmitted. The terminal that is a transmission destination, for example, is a terminal to which a manual input can be made among terminals registered (paired) in the voice assistant 105 in advance. Alternatively, a terminal that is a transmission destination may be a terminal to which a manual input can be made among terminals detected through a search for terminals disposed in the vicinity using proximity communication.

In addition, the method of determining a terminal that is a transmission destination is not limited thereto. In this modified example, the smartphone 103 is assumed as being determined as a terminal of a transmission destination. In Step S457, the communication unit 365 transmits an input URL to the smartphone 103. In the smartphone 103, the display unit 321 of the application 320 displays a screen of the input URL received in Step S457.

The screen of the input URL, for example, is a user registration screen as illustrated in FIG. 14A. When an input of user information is accepted on the screen, the display unit 321 transmits a use registration request for the mail-order service 310 from the user to the mail-order service 310 through the communication unit 322. In addition, in the request, in addition to the attribute information and the password input by the user, the information used for specifying the voice assistant 105 described above is combined, and the request is transmitted to the mail-order service 310. In this way, the use registration request transmitted in Step S458 and the process request transmitted by the voice assistant 105 in Step S454 in advance are associated with each other.

When a use registration request is accepted from the application 320 by the communication unit 317 of the mail-order service 310, in Step S459, the registration processing unit 311 executes user registration. In addition, the process of Step S459 is similar to the process of Step S402 according to the first embodiment illustrated in FIG. 9, and thus description thereof will not be presented here. In Step S460, the authenticator information processing unit 313 of the mail-order service 310 transmits a credential generation request to the voice assistant 105 through the communication unit 317.

In addition, at this time, the voice assistant of the transmission destination is specified on the basis of the information used for specifying the voice assistant 105 that is included in the use registration request transmitted by the application 320 of the smartphone 103 in Step S458. In the credential generation request, parameters similar to the case of the first embodiment are included. For example, the credential generation request includes a user ID issued when the process relating to user registration is executed by the mail-order service 310 in Step S459.

In Step S461, the communication unit 365 of the voice service 360 transmits a credential generation request to the smartphone 103. The smartphone 103 that is a transmission destination of the credential generation request may be the smartphone 103 that has transmitted the input URL used for inputting the user information in Step S456 but is not limited thereto. For example, a terminal detected through a search for terminals positioned in the vicinity using proximity communication again may be a terminal that is a transmission destination.

Here, for example, a case in which a credential generation request is transmitted to a smartphone 103 other than the smartphone 103 that is transmitted the input URL in Step S456 will be described. Processes of Steps S462 to S464 are similar to the processes of Steps S404 to S406 according to the first embodiment illustrated in FIG. 9, and thus description thereof will not be presented here.

In Step S465, the communication unit 322 of the application 320 transmits the credential and the authenticator ID to the voice assistant 105. In Step S466, the communication unit 365 of the voice service 360 searches for terminals positioned in the vicinity thereof using proximity communication. Then, in Step S467, the speech generating unit 363 prompts a user to select whether or not the detected terminal is additionally registered as an authentication device through a voice.

In Step S468, when a user's instruction for additional registration of the authentication device is transmitted to the voice assistant 105 through a voice, and the voice from the user is received by the voice receiving unit 361, the biometric authentication control unit 364 transmits a credential generation request to the instructed terminal. In this embodiment, the credential generation request is transmitted to the smartwatch 104.

The smartwatch 104 that has received the request in Step S468 executes processes of Steps S468 to S470 and transmits the credential and the authenticator ID to the voice assistant 105 in Step S471. The processes of Steps S468 to S471 are similar to the processes of Steps S462 to S465, and thus description thereof will not be presented here.

In Steps S472 and S473, the voice assistant 105 executes processes similar to those of Steps S415 and S473 according to the first embodiment illustrated in FIG. 9. In other words, in Step S472, the data storing unit 366 of the voice assistant 105 registers the following various kinds of information in the authenticator management table (table F). The various kinds of information include IP addresses and authenticator IDs of the smartphone 103 that has received the credential and the smartwatch 104, the user ID, and the like.

In addition, in Step S473, the data storing unit 366 stores the voiceprint information ID of the user that is temporarily stored in Step S453 and the user ID issued in Step S459 in the voiceprint information management table (table E) in association with each other. In Step S474, the communication unit 365 of the voice service 360 transmits credentials and authenticator IDs to the mail-order service 310.

The credentials transmitted here are the credentials generated in Steps S464 and S470. In addition, the authenticator IDs transmitted here are authenticator IDs respectively specifying the authenticators 330 and 350 that have generated the credentials in Steps S464 and S470.

In Step S475, the authenticator information processing unit 313 of the mail-order service 310 executes an authenticator registration process using the received credentials. The process of Step S475 is similar to that of Step S418 according to the first embodiment illustrated in FIG. 9, and thus description thereof will not be presented here.

Second Embodiment

In the first embodiment, a case in which the same user as the user who has executed use registration of a service adds another terminal as an authentication device and uses the service has been described. In contrast to this, in this embodiment, a case in which authentication is executed by a terminal of a user different from the user who has requested service provision will be described.

A same reference signal will be assigned to each component of the system and each apparatus and a common process according to the first embodiment, and description thereof will not be presented. In this embodiment, a case in which, after a user A executes service use registration of a mail-order service 310, for example, a user B who is a family member of the user A adds his or her own terminal as an authentication device will be described.

In more details, in a server 102, a user to which a user ID has been issued in processes of Steps S402, S459, and the like is only the user A, and a user ID has not been issued to the user B. The terminal held by the user B is used only as an authentication device in the mail-order service 310.

Figure 15:
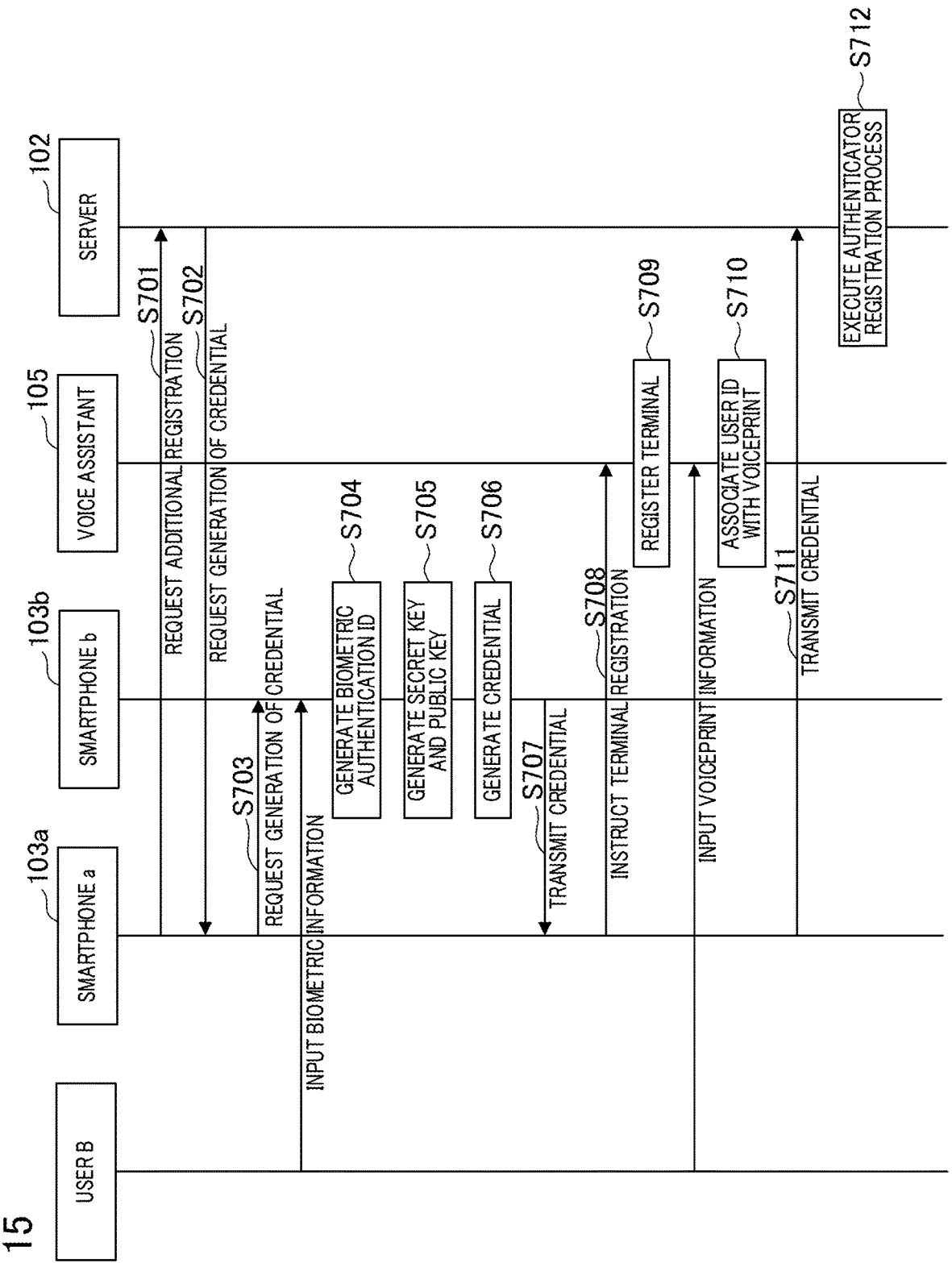
FIG. 15 is a diagram illustrating a process of adding a terminal of another user as an authentication device.

FIG. 15 is a diagram illustrating the sequence of a process of adding a terminal of another user as an authentication device. A smartphone of the user A will be represented as a smartphone 103a, and a smartphone of the user B will be represented as a smartphone 103b. The user A executes the use registration of a service illustrated in FIG. 9 using the smartphone 103a. Here, the user A displays a terminal addition menu screen using the smartphone 103a. The terminal addition menu screen is displayed by a display unit 321 of an application 320.

Figure 18A:
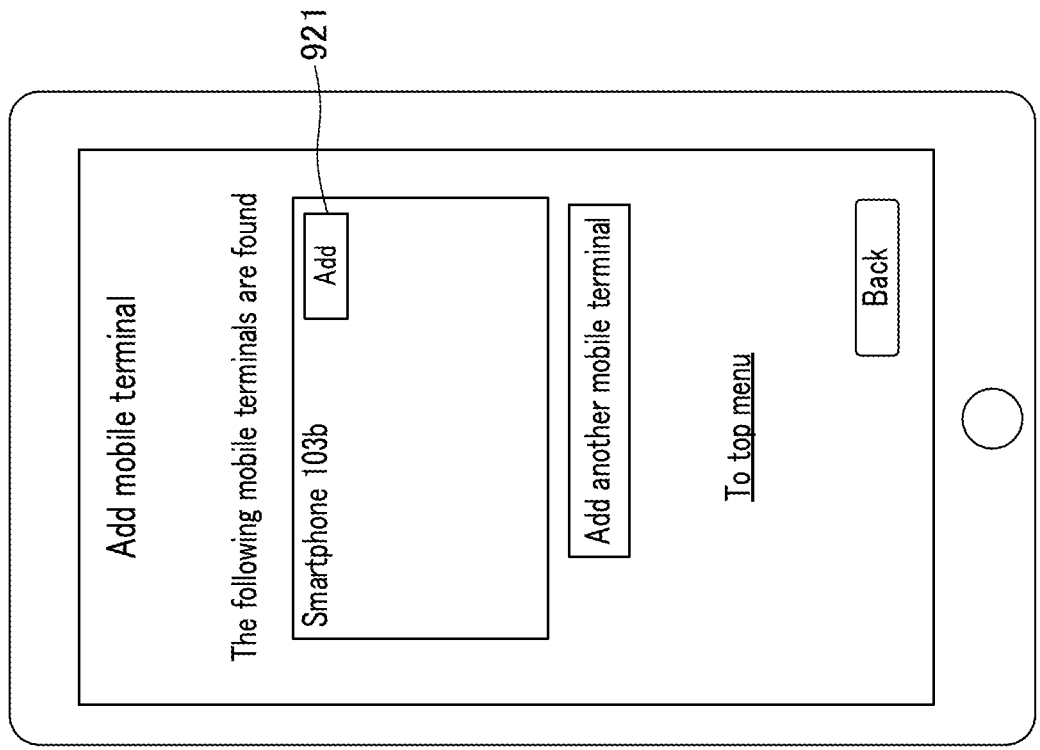
FIGS. 18A and 18B are one example of UIs displayed when an authentication device is added.

FIG. 18A is one example of a terminal addition menu screen. On the terminal addition menu screen, a button used for further adding a terminal of the user A and a button 911 used for adding a terminal of a user other than the user A are included. When the button 911 is pressed, the display unit 321 of the application 320 displays a terminal addition registration screen used for additionally registering another terminal as an authentication device.

Figure 18B:
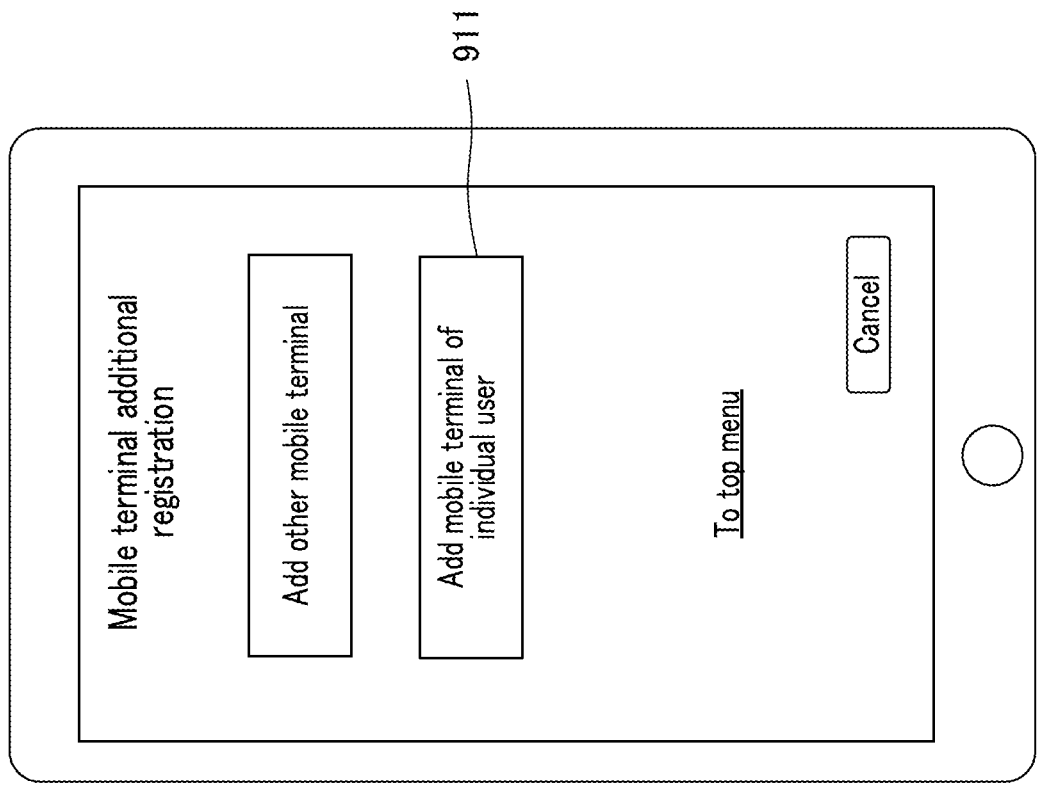

FIG. 18B is one example of a terminal addition menu screen. On the terminal addition registration screen, for example, a communication unit 322 of the application 320 searches for terminals positioned in the vicinity thereof using proximity communication such as NFC or Bluetooth and displays detected terminals in a list of the terminal addition registration screen as terminals registered as authentication devices. In addition, for example, a user may be allowed to input information relating to a terminal desired to be additionally registered as an authentication device.

In such a case, information of an IP address and the like of the terminal, which is necessary for the smartphone 103a to communicate with the terminal, is input. A button 921 is a button that is used for accepting an instruction for additional registration of a terminal corresponding to the button, the smartphone b in the example illustrated in FIG. 18B. When the button 921 is pressed, the process represented in FIG. 15 is started.

Description will be continued with reference to FIG. 15. In Step S701, when an instruction for additional registration of the smartphone b is accepted in accordance with pressing of the button 921, the display unit 321 of the application 320 included in the smartphone 103a transmits an additional registration request to the mail-order service 310 through the communication unit 322. At this time, the application 320 also notifies of a user ID assigned to the user A. The user ID of the user A is assumed to be "user001."

The authenticator information processing unit 313 of the mail-order service 310 acquires an attestation challenge corresponding to the user A from an attestation challenge management table (table C). In this embodiment, the attestation challenge issued to the user A is used as a parameter included in a credential generation request used when the authenticator of the user B is registered. The attestation is not limited thereto, and a separate attestation may be issued.

In Step S702, the authenticator information processing unit 313 transmits a credential generation request to the smartphone 103a through the communication unit 317. In Step S703, the display unit 321 of the smartphone 103a transmits the credential generation request to the smartphone 103b through the communication unit 322. Processes of Step S704 to S706 in the smartphone 103b that has received the request are similar to the processes of Steps S404 to S406 described in the first embodiment with reference to FIG. 9, and thus description thereof will not be presented here.

In Step S707, the smartphone 103b transmits a credential and an authenticator ID to the smartphone 103a. In Step S708, the application 320 of the smartphone 103a registers a terminal that is an authentication device in the voice assistant 105.

More specifically, at this time, the display unit 321 of the application 320 transmits a user ID and information used for specifying the smartphone b executing additional registration to be described later to the voice assistant 105. The user ID is a user ID acquired by adding a sub number to the user ID issued when the user executes use registration of the mail-order service (Step S402).

For example, in a case in which the user ID issued to the user A is "user001," the user ID transmitted here is a user ID such as "user001-01." Alternatively, the application 320 may deliver the user ID issued when the user A executes use registration of the mail-order service (Step S402), and a sub number may be added on the voice assistant 105 side.

In Step S709, the data storing unit 366 of the voice service 360 stores (registers) the various kinds of information received in Step S708 in an authenticator management table (table F). When the process of Step S709 is completed, the voice assistant 105 is in a state in which voiceprint information registration of the user is accepted. The speech generating unit 363 of the voice service 360 notifies the user of an indication thereof through a voice.

For example, the speech generating unit 363 gives a notification using speech "Voiceprint information is being registered. Please talk!," thereby prompting the user to input biometric information. When the user B speaks to the voice assistant 105, and the voice receiving unit 361 receives a voice from the user B, the voice analyzing unit 362 generates an ID corresponding to a feature quantity of the voiceprint information of the user in Step S710. Then, the data storing unit 366 stores the generated voiceprint information ID and the user ID that has been received in Step S708 in the voiceprint information management table (table E) in association with each other.

In Step S711, the communication unit 322 of the application 320 included in the smartphone 103a transmits the credential and the authenticator ID received from the smartphone b in Step S707 to the mail-order service 310. In Step S712, the authenticator information processing unit 313 of the mail-order service 310 executes a registration process of the authenticator using the received credential.

In addition, the registration process of the authenticator is similar to that of Step S418 described in the first embodiment with reference to FIG. 9, and thus description thereof will not be presented. The authenticator of the smartphone 103b is stored (registered) in the authenticator information management table (table D) in association with the user ID issued to the user A.

Figure 16:
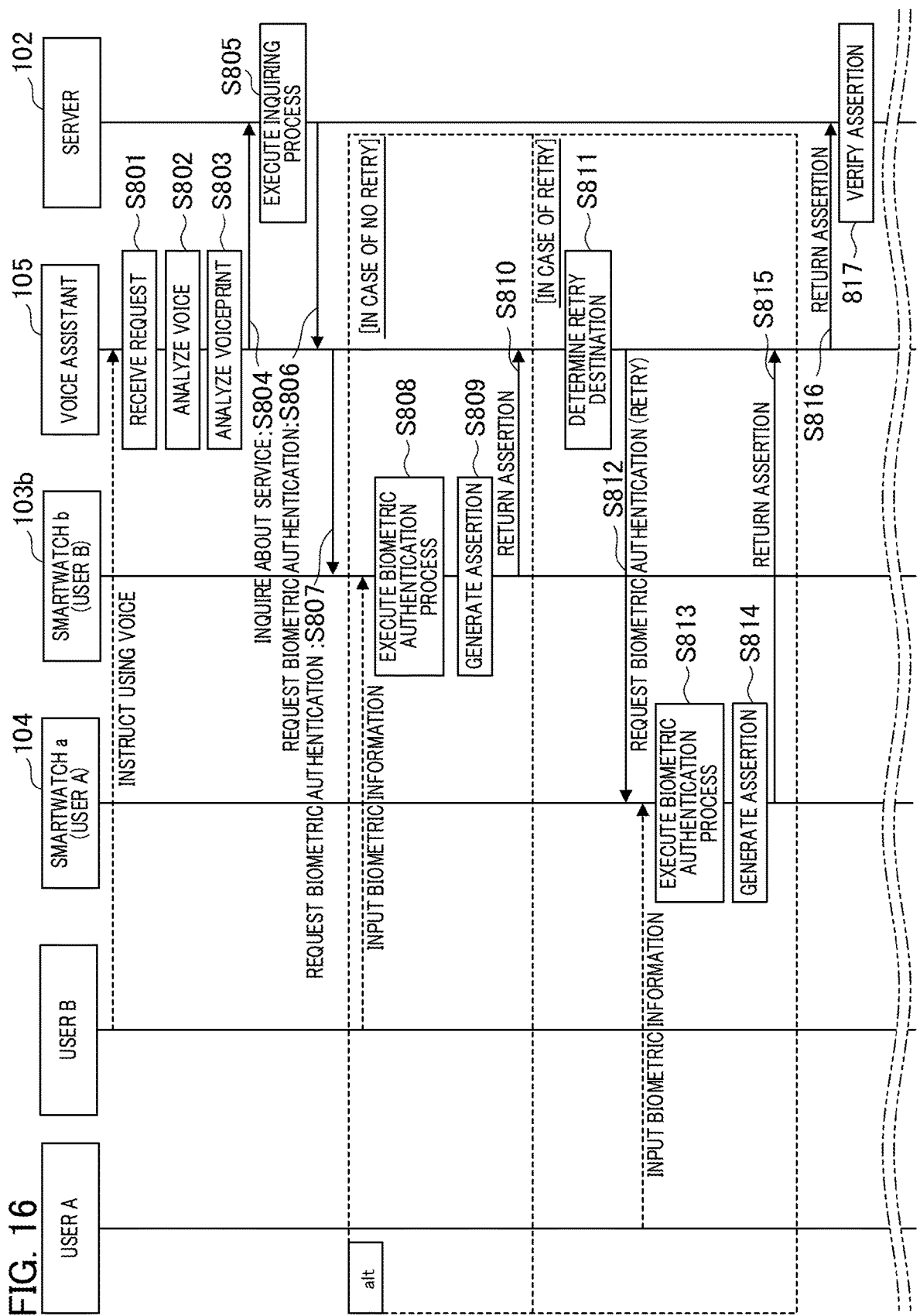
FIG. 16 is a diagram illustrating a process performed when a service according to a second embodiment is used.
Figure 17:
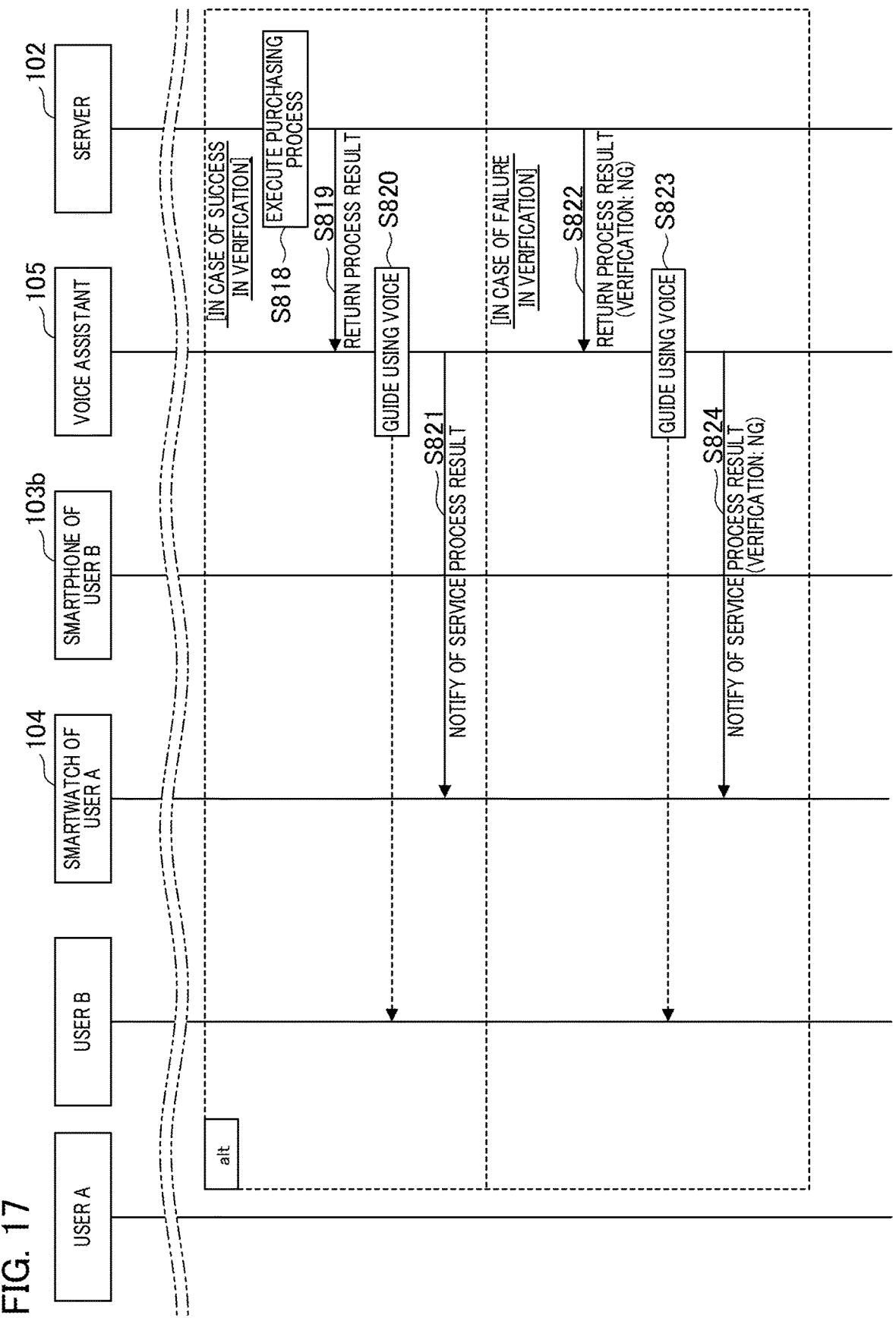
FIG. 17 is a diagram illustrating a process performed when a service according to the second embodiment is used.

Next, the user B uses the mail-order service 310 through the voice assistant 105 will be described with reference to FIGS. 16 and 17.

The user B transmits a use request of the mail-order service 310 to the voice assistant 105 using speech generation (voice). Hereinafter, a case in which the user B requests the mail-order service 310 to execute a product purchase will be described.

The processes of Steps S801 to S804 in which the voice assistant 105 that has received the request transmits the user's request to the mail-order service 310 are similar to those of Steps S501 to D504 described in the first embodiment with reference to FIG. 12, and thus description thereof will not be presented here. In Step S805, the service processing unit 316 of the mail-order service 310 determines whether or not user authentication is necessary in a case in which a process according to the received request is executed.

Here, since a content of the request is a product purchase, and the request is a request accompanying payment, the service processing unit 316 determines that user authentication is necessary. Thus, in Step S806, the authenticator information storing unit 314 transmits user authentication, in other words, a request for biometric authentication to the voice assistant 105 through the communication unit 317. The voice assistant 105 that has received the request for biometric authentication acquires a user ID associated with the voiceprint information ID of the user B that is temporarily stored in Step S803 by the biometric authentication control unit 364 of the voice service 360 using the voiceprint information management table (table E).

In Step S807, the biometric authentication control unit 364 specifies an authenticator (terminal) to execute a request for biometric authentication using the authenticator management table (table F). In more details, in the authenticator management table (table F), a terminal having the highest priority level among the authenticators associated with the user ID is specified as an authentication device.

In this embodiment, as the user ID associated with the voiceprint information ID of the user B, "user001-01" that is an user ID acquired by adding a sub number to the user ID of the user A is specified in the table E. Then, as a terminal associated with the user ID, the smartphone b is specified in the table F. Then, the biometric authentication control unit 364 transmits a request for biometric authentication to the smartphone b through the communication unit 365.

The processes of Steps S808 to S810 executed by the smartphone b that has received the request for biometric authentication are similar to those of Steps S515 to S517 described in the first embodiment with reference to FIG. 13, and thus description thereof will not be presented here. However, n Step S807, when the voice assistant 105 transmits the request for biometric authentication, there may be a case in which power of the smartphone 103b is off, a case in which the smartphone b is not held by the user B, and the like.

In such cases, even when a predetermined time has elapsed, the biometric information is presented, and time-out occurs, and the request for biometric authentication of Step S807 fails. In addition, in a case in which the authenticator 330 of the smartphone b executes biometric authentication, and the authentication fails, the request for biometric authentication of Step S807 fails. In a case in which the request for biometric authentication fails, the process proceeds to Step S811. In Step S811, the biometric authentication control unit 364 determines a terminal that is a retry destination.

Here, the biometric authentication control unit 364, similar to the case of the first embodiment, a terminal associated with the user ID of the user B in the authentication management table (table F) is determined as a retry destination in accordance with a priority level. In addition, in this embodiment, in a case in which authentication requests have failed in all the terminals registered with associated with the user ID of the user B in the authenticator management table (table F), the following process is executed.

The biometric authentication control unit 364 searches for a terminal of a user other than the user B that can be used as an authentication device. At this time, the biometric authentication control unit 364 searches for the user ID including a text string "user001" acquired by excluding the sub number from the user ID "user001-01" assigned to the user B from the authenticator management table (table F). In addition, "user001-01" for which the authentication request already has failed is excluded form search targets.

Then, in Step S812, the biometric authentication control unit 364 executes a request for biometric authentication using a terminal corresponding to the retrieved user ID as a retry destination. Here, the request for biometric authentication is executed for the smartwatch 104 of the user A as a retry destination. For example, since "user001" that is the user ID of the user A is retrieved, the smartwatch 104 having the highest priority level among terminals of the user A is determined as a retry destination for which the next request for biometric authentication is executed.

In addition, similar to the user B, in a case in which there is a user ID acquired by adding a sub number to the user ID of the user A such a user ID is also retrieved, and a terminal associated with the user ID is a candidate for the retry destination as well. The voice assistant 105 may maintain an order in which a terminal of a user among retrieved users is determined as a retry destination, in other words, the priority levels of the users in the authenticator management table (table F).

The priority levels of users, for example, may be set by the users or may be automatically set such as in a case in which the priority level is highly set in order of registration in the authenticator management table (table F) or the like. In this way, in a case in which the smartphone b cannot be used, the user A who is another user such as a family member present in the vicinity or the like can execute user authentication instead of the user B. Here, a case in which the smartphone b cannot be used includes a case in which the power of the smartphone 103b of the user B who has executed the use request of a service is off, a case in which the smartphone 103b is unintentionally left in another room and is not held by the user B, and the like.

In addition, in such a case, a request of biometric authentication for a user other than a user associated with the voiceprint information ID analyzed in Step S803 is made. For this reason, in a case in which a request for biometric authentication is retried for a user different from the user who has executed the use request of a service, the voice assistant 105 transmits the request of the biometric authentication with information representing no use of automatic authentication in the wearable terminal or the like of the user A included therein. The reason for this is to prevent automatic authentication while the user requested to execute biometric authentication is not aware of the authentication for a use request of a service executed by another user different from the user requested to execute the biometric authentication.

Processes of Steps S813 to S815 executed by the smartwatch 104 of the user A who has received the request for biometric authentication are similar to those of Steps S515 to S517 described in the first embodiment with reference to FIG. 13, and thus description thereof will not be presented here. In addition, in a case in which the smartwatch 104 has a function of automatically executing vein pattern authentication without explicitly requesting a user to present biometric information, in a case in which information indicating no use of the automatic authentication is included in the request for biometric information as described above, the automatic authentication is not executed. In the smartwatch 104, the user A needs to explicitly input biometric information.

In Step S816, the communication unit 365 of the voice service 360 returns the assertion information received in Step S810 or S815 to the mail-order service 310. Processes executed by the mail-order service 310 that has received the assertion information in Step S816 after Step S817 are similar to those of Steps S524 to S529 described in the first embodiment with reference to FIG. 13, and thus description thereof will not be presented here.

In Step S821 and S824, the speech generating unit 363 of the voice service 360 notifies the user of an acceptance result of the request received in Step S801 through a voice. Here, in a case in which a user who has executed the request and a user who has executed the biometric authentication are different from each other, the acceptance result of the request is notified also to the user who has executed the biometric authentication. In the example described above, the acceptance result is notified to the smartphone b that has executed the request and a smartphone a associated with the user A who has executed the biometric authentication process. As the notification, in addition to a notification using speech, for example, a message or the like may be transmitted to a target terminal.

As described above, in this embodiment, a user ID issued to the user A by the mail-order service 310 registering the user A is managed in association with a mobile terminal of another user B. However, the configuration is not limited thereto, and, for example, each of the user A and the user B may execute user registration in the mail-order service 310.

In such a case, when the user A executes a request for the use of a service, in a case in which a request for biometric authentication fails in the authentication device registered by the user A, the voice assistant 105 does not execute Step S811 and a search using a text string of the user ID who has executed the request. The voice assistant 105 sets terminals associated with all the user IDs of other users registered in the authenticator management table (table F) as candidates for a retry destination.

In such a case, for example, when a biometric authentication process is executed by a terminal of not the user A who has executed the request for the use of a service but the user B, a result thereof is returned to the service. The mail-order service 310 determines a request for the use of a service from the user ID associated with the user B, and a product purchasing process is executed using an account of the user B.

Other Embodiments

Embodiments of the present invention can also be realized by a computer of a system or apparatus that reads out and executes computer executable instructions (eg, one or more programs) recorded on a storage medium (which may also be referred to more fully as a 'non-transitory computer-readable storage medium') to perform the functions of one or more of the above-described embodiments and/or that includes one or more circuits (e.g, application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g, central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-228380, filed Nov. 28, 2017 which is hereby incorporated by reference wherein in its entirety.

What is claimed is:

1. A system including a plurality of terminals and an information processing apparatus that is capable of communicating with the plurality of terminals and a service providing system on a network,
   wherein each of two or more terminals of the plurality of terminals comprises:
      an authentication module that is used for an authentication process;
      a storage having a tamper resistance configured to store biometric information required when the authentication process is performed using the authentication module;
      a biometric information sensor configured to read biometric information;
      a memory storing second instructions, and
      at least one processor executing the second instructions causing the respective terminals to:
         generate a secret key and a public key when a user's biometric information is registered into the storage; and
         store information identifying the service providing system, the user's biometric information, and the generated secret key in the storage in association with each other, wherein the public key is registered in the service providing system via the information processing apparatus,
   wherein the information processing apparatus comprises:
      a memory storing first instructions, and
      at least one processor executing the first instructions causing the information processing apparatus to:
         request a first terminal among the two or more terminals to execute an authentication process in a case in which an authentication request is accepted from the service providing system;
         receive a result of the authentication process from one of the two or more terminals; and
         transmit the result of the authentication to the service providing system as a response to the authentication request,
   wherein the second instructions further cause the first terminal to:

execute, by the authentication module, the authentication process using the user's biometric information stored in the storage and biometric information read by the biometric information sensor in a case in which a request from the information processing apparatus is received; and transmit a result of the executed authentication process to the information processing apparatus as a response to the request from the information processing apparatus, and wherein the first instructions further cause the information processing apparatus to, in a case in which a predetermined condition is satisfied after requesting the first terminal to execute the authentication process, request a second terminal other than the first terminal among the two or more terminals to execute an authentication process.

2. The system according to claim 1, wherein, as the result of the authentication process, signature data is transmitted to the information processing apparatus, and wherein the signature data is generated using a parameter received from the service providing system via the information processing apparatus and the secret key stored in the storage in association with the user's biometric information used when the authentication process has been successful.

3. The system according to claim 1, wherein the predetermined condition is determined as being satisfied in a case in which the information processing apparatus has not received a response of the result of the authentication process from the first terminal within a predetermined time after requesting the first terminal to execute the authentication process.

4. The system according to claim 1, wherein the first instructions further cause the information processing apparatus to specify the first terminal among the two or more terminals in accordance with priority levels.

5. The system according to claim 1, wherein the first instructions further cause the information processing apparatus to:

accept registration information including the public key generated by one of the two or more terminals; and issue a request for registering the accepted registration information in the service providing system.

6. The system according to claim 1, wherein the information processing apparatus is a voice assistant device that analyzes an input using speech from a user and communicates with the service providing system on the basis of a result of the analysis.

7. The system according to claim 1, wherein the two or more terminals include a wearable terminal and a smartphone.

8. The system according to claim 7, wherein the first terminal is a smartwatch or smartglasses as the wearable terminal.

9. A method executed in a system including a plurality of terminals and an information processing apparatus that is capable of communicating with the plurality of terminals and a service providing system on a network, wherein each of two or more terminals of the plurality of terminals comprises an authentication module that is used for an authentication process; a storage having a tamper resistance configured to store biometric information required when the authentication process is performed using the authentication module; and a biometric information sensor configured to read biometric information, the method comprising:

generating, on each of the two or more terminals, a secret key and a public key when user's biometric information is registered into the storage;

storing, on each of the two or more terminals, information identifying the service providing system, the user's biometric information, and the generated secret key in the storage in association with each other, wherein the public key is registered in the service providing system, requesting a first terminal among the two or more terminals to execute an authentication process in a case in which an authentication request is accepted from the service providing system using the information processing apparatus;

executing, by the authentication module, the authentication process using the user's biometric information stored in the storage and biometric information read by the biometric information sensor in a case in which a request from the information processing apparatus is received by using a terminal that has been requested to perform the authentication process;

transmitting a result of the executed authentication process to the information processing apparatus as a response to the request from the information processing apparatus, by using the terminal that has been requested to perform the authentication process;

receiving a result of the authentication process from any one of the two or more terminals using the information processing apparatus; and transmitting the result of the authentication to the service providing system as a response to the authentication request using the information processing apparatus, wherein the information processing apparatus requests a second terminal other than the first terminal among the two or more terminals to execute an authentication process in a case in which a predetermined condition is satisfied after the information processing apparatus requests the first terminal to execute the authentication process in the request.

10. An information processing apparatus that is capable of communicating with a plurality of terminals and a service providing system on a network, wherein each of the two or more terminals comprises an authentication module that is used for an authentication process; a storage having a tamper resistance configured to store biometric information required when the authentication process is performed using the authentication module; and a biometric information sensor configured to read biometric information, the information processing apparatus comprising:

a memory storing first instructions, and at least one processor executing the first instructions causing the information processing apparatus to:

request a first terminal among the two or more terminals to execute an authentication process in a case in which an authentication request is accepted from the service providing system;

receive a result of the authentication process from one of the two or more terminals; and transmit the result of the authentication to the service providing system as a response to the authentication request, wherein the first instructions further cause the information processing apparatus to, in a case in which a predetermined condition is satisfied after requesting the first terminal to execute the authentication process, request a second terminal other than the first terminal among the two or more terminals to execute an authentication process, wherein each of the two or more terminals generates a secret key and a public key when a user's biometric information is registered into the storage, and stores information identifying the service providing system, the user's biometric information, and the generated secret key in the storage in association with each other, and wherein the public keys of each of the two or more terminals is registered in the service providing system.

11. A method of controlling an information processing apparatus that is capable of communicating with a plurality of terminals and a service providing system on a network, wherein each of the two or more terminals comprises: an authentication module that is used for an authentication process; a storage having a tamper resistance configured to store biometric information required when the authentication process is performed using the authentication module; and a biometric information sensor configured to read biometric information, the method comprising:

requesting a first terminal among the two or more terminals to execute an authentication process in a casein which an authentication request is accepted from the service providing system;

receiving a result of the authentication process from one of the two or more terminals; and transmitting the result of the authentication to the service providing system as a response to the authentication request, wherein, in the requesting, it is requested for a second terminal other than the first terminal among the two or more terminals to execute an authentication process in a case in which a predetermined condition is satisfied after requesting the first terminal to execute the authentication process, wherein each of the two or more terminals generates a secret key and a public key when user's biometric information is registered into the storage, and stores information identifying the service providing system, the user's biometric information, and the generated secret key in the storage in association with each other, and wherein the public keys of each of the two or more terminals is registered in the service providing system.

12. A non-transitory readable storage medium which stores a program causing a computer to execute a control method for an information processing apparatus that is capable of communicating with a plurality of terminals and a service providing system on a network, wherein each of the two or more terminals comprises: an authentication module that is used for an authentication process; a storage having a tamper resistance configured to store biometric information required when the authentication process is performed using the authentication module; and a biometric information sensor configured to read biometric information, the method comprising:

requesting a first terminal among the two or more terminals to execute an authentication process in a casein which an authentication request is accepted from the service providing system;

receiving a result of the authentication process from one of the two or more terminals; and transmitting the result of the authentication to the service providing system as a response to the authentication request, wherein, in the requesting, it is requested for a second terminal other than the first terminal among the two or more terminals to execute an authentication process in a case in which a predetermined condition is satisfied after requesting the first terminal to execute the authentication process, wherein each of the two or more terminals generates a secret key and a public key when a user's biometric information is registered into the storage, and stores information identifying the service providing system, the user's biometric information, and the generated secret key in the storage in association with each other, and wherein the public keys of each of the two or more terminals is registered in the service providing system.

* * * * *